United States Patent [19]
Horishi et al.

[11] Patent Number: 6,057,885
[45] Date of Patent: May 2, 2000

[54] PICTURE INFORMATION CONVERTING APPARATUS AND METHOD THEREOF AND SUM-OF-PRODUCT CALCULATING CIRCUIT AND METHOD THEREOF

[75] Inventors: Takashi Horishi; Masashi Uchida; Tetsujiro Kondo, all of Kanagawa, Japan

[73] Assignee: Sony Corporation, Tokyo, Japan

[21] Appl. No.: 09/011,115

[22] PCT Filed: May 30, 1997

[86] PCT No.: PCT/JP97/01852

§ 371 Date: Jan. 30, 1998

§ 102(e) Date: Jan. 30, 1998

[87] PCT Pub. No.: WO97/46014

PCT Pub. Date: Dec. 4, 1997

[30] Foreign Application Priority Data

May 30, 1996 [JP] Japan ..................................... 8-158905
Sep. 12, 1996 [JP] Japan ..................................... 8-263708

[51] Int. Cl.[7] ...................................................... H04N 7/01
[52] U.S. Cl. ........................ 348/450; 348/458; 364/750.5
[58] Field of Search ..................................... 348/450, 458, 348/448, 441, 581; 364/750.5, 736.02; 395/562; 382/298–300

[56] References Cited

U.S. PATENT DOCUMENTS

| 5,138,574 | 8/1992 | Aoki et al. | 364/750.5 |
| 5,182,633 | 1/1993 | Antonio et al. | 348/441 |
| 5,469,216 | 11/1995 | Takahashi et al. | 348/441 |
| 5,719,633 | 2/1998 | Nishio et al. | 348/441 |
| 5,732,251 | 3/1998 | Bartkowiak | 398/562 |
| 5,784,116 | 7/1998 | Pan et al. | 348/450 |
| 5,835,160 | 11/1998 | Chen et al. | 348/441 |

*Primary Examiner*—Victor R. Kostak
*Attorney, Agent, or Firm*—Frommer Lawrence & Haug, LLP.; William S. Frommer

[57] ABSTRACT

An ADRC circuit 3 generates spatial classes with SD data extracted by an area extracting circuit 2. A moving class determining circuit 5 generates a moving class with SD data extracted by an area extracting circuit 4. A class code generating circuit 6 generates a class code with the spatial class and the moving class. A tap decreasing ROM 7 supplies additional code data for each class code to a tap decreasing code 10. The additional code data is used to decrease taps of SD data. The tap decreasing circuit 10 decreases the SD data extracted by an area extracting circuit 9. A prediction calculating circuit 11 receives coefficient data corresponding to the class code from a ROM table 8 and obtains HD data with the decreased SD data corresponding to a linear prediction equation.

15 Claims, 22 Drawing Sheets

Fig. 6

| MOVING CLASS | 0 | 1 | 2 |
|---|---|---|---|
| NUMBER OF ADDRESS BEFORE NUMBER OF BITS OF CLASS CODE IS DECREASED | 0~15 | 16~31 | 32~47 |
| NUMBER OF ADDRESS AFTER NUMBER OF BITS OF CLASS CODE IS DECREASED | 0~15 | 16~23 | 24~31 |

Fig. 7

| MOVING CLASS | 0 | 1 | 2 | 3 |
|---|---|---|---|---|
| NUMBER OF ADDRESS BEFORE NUMBER OF BITS OF CLASS CODE IS DECREASED | 0~15 | 16~31 | 32~47 | 48~63 |
| NUMBER OF ADDRESS AFTER NUMBER OF BITS OF CLASS CODE IS DECREASED | 0~15 | 16~23 | 24~31 | |

| T | DELAY REGISTER BY TIME T |

| ▽ α | MULTIPLYING DEVICE WITH FILTER COEFFICIENT α |

| ⊕ | ADDING DEVICE |

PICTURE INFORMATION CONVERTING APPARATUS AND METHOD THEREOF AND SUM-OF-PRODUCT CALCULATING CIRCUIT AND METHOD THEREOF

DESCRIPTION

Picture information converting apparatus and method thereof and sum-of-product calculating circuit and method thereof

TECHNICAL FIELD

The present invention relates to a picture information converting apparatus and a method thereof suitable for use with for example a television receiver, a video tape recorder, and so forth, in particular, to a picture information converting apparatus and a method thereof for converting picture information with a normal resolution supplied from the outside into picture information with a high resolution and to a sum-of-products calculating circuit for allowing the number of multiplicands and the number of multipliers to be decreased without an adverse influence of calculated result.

BACKGROUND ART

Due to strong needs of improved audio-visual environments, a television system that has a higher resolution than the conventional systems was desired. As a result, a so-called high-vision system was developed. The number of scanning lines of the high-vision system (1125 lines) is more than twice of the number of scanning lines of the so-called NTSC system (525 lines). In addition, the aspect ratio of the display screen of the high-vision system (9:16) is a wide-angle more than the aspect ratio of the display screen of the NTSC system (3:4). Thus, the high-vision system provides the users with high-resolution and sense of presence.

The high-vision system, which has such excellent characteristics, cannot directly display a picture with an NTSC picture signal due to a difference of their standards. Thus, to display an NTSC picture signal on a display of the high-vision system, the rate of the picture signal is converted with a picture information converting apparatus as shown in FIG. 20.

In FIG. 20, the conventional picture information converting apparatus comprises a horizontal interpolating filter 152 and a vertical interpolating filter 153. The horizontal interpolating filter 152 horizontally interpolates an NTSC picture signal (SD data) received from an input terminal 151. The vertical interpolating filter 153 vertically interpolates the picture signal that has been horizontally interpolated.

In reality, the horizontal interpolating filter 152 has a structure as shown in FIG. 21. In the example shown in FIG. 21, the horizontal interpolating filter 152 is composed of a cascade-connected FIR filter. In FIG. 21, reference numeral 161 is an input terminal to which SD data is supplied. Reference numerals $162_0$ to $162_m$ are multiplying devices that multiply SD data by filter coefficients $\alpha_0$ to $\alpha_m$, respectively. Reference numerals $163_0$ to $163_{m-1}$ are adding devices. Reference numerals $164_1$ to $164_{m-1}$ are delay devices by time T (where T is one sampling period). Output data that has been horizontally interpolated is supplied from an output terminal 165. The output data is supplied to the vertical interpolating filter 153.

The vertical interpolating filter 153 has the similar structure to the horizontal interpolating filter 152. The vertical interpolating filter 153 interpolates pixels in the vertical direction so as to vertically interpolate pixels of the NTSC picture signal that have been horizontally interpolated. The resultant high-vision picture signal (HD data) is supplied to a high-vision receiver. Thus, the high-vision receiver can display a picture corresponding to the NTSC picture signal.

However, the conventional picture information converting apparatus simply interpolates pixels in the horizontal and vertical directions corresponding to the NTSC picture signal. Thus, the resolution of the resultant signal that has been horizontally and vertically interpolated is the same as that of the original NTSC picture signal. In particular, when a normal picture is converted, it is normally interpolated in the vertical direction in the field thereof. In this case, since fields of the picture are not correlated, due to a conversion loss in still picture portions, the resolution of the resultant picture signal becomes lower than that of the NTSC picture signal.

To solve such a drawback, the applicant of the present patent application has proposed a picture signal converting apparatus (as Japanese Patent Application No. HEI 6-205934) that categorizes a picture signal level of an input signal as a class corresponding to a three-dimensional (temporal and spatial) distribution thereof, stores a prediction coefficient value that has been learnt corresponding to each class in a storing means, and outputs an optimum estimation value corresponding to a prediction equation.

In the method used in the apparatus, when HD (High Definition) pixels are created, relevant SD (Standard Definition) pixel data is categorized as a class. A prediction coefficient value for each class is learnt beforehand. Pixel data in a still picture portion is correlated in the frame. Pixel data in a moving picture portion is correlated in the field. Thus, HD data that is similar to a true picture signal of a still picture is skillfully obtained.

For example, to generate HD pixels $y_1$ to $y_4$ as shown in FIGS. 2 and 3, the average value of differences of SD pixels $m_1$ to $m_5$ and SD pixels $n_1$ to $n_5$ shown in FIG. 5 at the same spatial position of different frames are calculated. The calculated average value is categorized as a class with a threshold value so as to represent a moving degree.

Likewise, as shown in FIG. 4, SD pixels $k_1$ to $k_5$ are processed by the ADRC (Adaptive Dynamic Range Coding) technique. Thus, the picture signal is categorized as a class with a small number of bits so as to represent a waveform in the space.

With SD pixels $x_1$ to $x_{25}$ as shown in FIG. 9, linear equations are created corresponding to the individual classes categorized by the above-described two types of class categorizations as so as to learn and obtain prediction coefficient values. In this system, classes that represent the moving degree and the waveform in the space are separately and adequately categorized. Thus, with a relatively small number of classes, high conversion characteristics can be obtained. A HD pixel y is predicted with prediction coefficient values $w_n$ obtained as described above corresponding to the following formula (1).

$$y = w_1 x_1 + w_2 x_2 + \ldots + w_n x_n \tag{1}$$

where n=25.

As described above, predication coefficient values for predicting individual HD data corresponding to SD data are learnt and obtained beforehand. The resultant prediction coefficient values are stored in a ROM table. By outputting SD data and prediction coefficient values that have been read from the ROM table, data similar to real HD data can be output unlike with data of which input SD data is simply interpolated.

Next, with reference to FIG. 22, a real operation of the prior art reference will be described. SD pixel data is received from an input terminal 171. The SD pixel data is supplied to area extracting circuits 172, 174, and 178. The area extracting circuit 172 extracts SD pixels $k_1$ to $k_5$ as shown in FIG. 4 so as to perform a class categorization that represents a waveform in the space. An ADRC circuit 173 performs the ADRC process. The area extracting circuit 174 extracts SD pixels $m_1$ to $m_5$ and SD pixels $n_1$ to $n_5$ as shown in FIG. 5 so as to perform a class categorization that represents a moving degree of the pixels. A moving class determining circuit 175 calculates the average value of differences of pixels at the same position among frames in the space, limits the average value with a predetermined threshold value, and categorizes the resultant value as a class.

A class code generating circuit 176 generates a class corresponding to the class received from the ADRC circuit 173 and the class received from the moving class determining circuit 175. A ROM table 177 reads a prediction coefficient corresponding to the generated class. The area extracting circuit 178 extracts SD pixels $x_1$ to $x_{25}$ as shown in FIG. 9 and supplies them to a prediction calculating circuit 179. The prediction calculating circuit 179 outputs HD data corresponding to the liner equation expressed by the formula (1) through an output terminal 180.

FIG. 23 shows a sum-of-products calculating circuit for use with such a picture signal converting apparatus. A multiplicand register 191 supplies a plurality of SD data to a sum-of-products calculating device 192. An address controlling circuit 193 supplies class codes class corresponding to the SD data to a multiplier memory 194. The multiplier memory 194 supplies coefficient data corresponding to the class codes class to the sum-of-products calculating device 192. The sum-of-products calculating device 192 calculates the sum of products of SD data and coefficient data. The resultant sum-of-products data is supplied from an output terminal 195.

As an example of the sum-of-products calculating circuit 192, as shown in FIG. 24, SD data is received from an input terminal 201. The SD data is supplied to a multiplying device 205 through a register 202. Coefficient data is received from an input terminal 203. The coefficient data is supplied to a multiplying device 205 through a register 204. The multiplying device 205 multiplies the SD data by the coefficient data. The multiplied output is supplied to an adding device 207 through a register 206. The adding device 207 adds the two multiplied outputs. An output of the adding device 207 is supplied to an adding device 209 through a register 208. The adding device 209 adds two added outputs. An output of the adding device 209 is supplied from an output terminal 211 through a register 210.

In operations with the sum-of-products calculating circuit, multipliers (coefficient data) are stored in a memory or the like beforehand. Corresponding to characteristics of a picture (namely, class information), multipliers are varied. Such a structure has been used for converting picture signals.

In the class categorizing picture information converting process, as the number of pixels used for the prediction calculation increases, the converting performance improves. In other words, as the value n in the formula (1) increases, the converting performance improves. Generally speaking, the converting performance is proportional to the number of taps of a filter.

However, when a converting apparatus of which the value n in the equation (1) is large is fabricated, the circuit scales of the ROM table that stores coefficients and of the circuit that performs the prediction calculation become large.

In addition, when the number of classes is increased, the capacity of the multiplier memory increases corresponding to the number of types of multipliers. Thus, the hardware scale increases.

As described above, it is very difficult to structure the process for converting class categorized picture information with high conversion performance in a small-scale at low cost.

DISCLOSURE OF THE INVENTION

Therefore, a first object of the present invention is to provide a picture information converting apparatus and a method thereof for converting an NTSC picture signal into a high-vision picture signal with a small and inexpensive circuit while satisfying the converting performance accomplished by a filter with many taps.

A second object of the present invention is to provide a picture information converting apparatus and a method thereof that accomplish nearly the same performance as the conventional apparatus with a remarkably reduced hardware circuit.

A third object of the present invention is to provide a sum-of-products calculating circuit and a method thereof for reducing the hardware scale from a viewpoint of the above-described problem.

The present invention is a picture information converting apparatus for converting a first digital picture signal into a second digital picture signal, the number of pixels of the second digital picture signal being larger than the number of pixels of the first digital picture signal, comprising a pixel extracting means for extracting the first digital picture signal at a predetermined position thereof, a class determining means for detecting a pattern of a level distribution of the first digital picture signal extracted by the pixel extracting means, determining a class of the second digital picture signal to be predicted corresponding to the pattern, and outputting the determined class information, a tap decreasing means for integrating data of a plurality of taps of the first digital picture signal into data of a smaller number of taps corresponding to similar coefficient data for each class information, a coefficient data storing means for storing coefficient data of a linear prediction equation for each class information, and a predicting means for predicting the second digital picture signal with the integrated first digital picture signal and the coefficient data corresponding to a linear prediction equation.

The picture information converting apparatus according to the present invention detects a pattern of a level distribution of SD pixels in the vicinity of HD pixels to be generated, determines a class of the picture information in the area corresponding to the detected pattern, and outputs class detection information. Particular class information corresponding to an address of the coefficient memory is read. Similar coefficients have been integrated and decreased. For each class, a tap decreasing circuit integrates SD pixel data that is multiplied by integrated coefficients in the same conditions as the coefficients. Thus, pixels that are apparently used in the predicting calculations are deleted. A coefficient data storing means stores picture information received from the outside for each class of coefficient data of the linear prediction equation that is information necessary for converting picture information received from the outside into picture information with a higher resolution than that thereof. The coefficient data is output corresponding to class detection information. A picture information converting means converts the picture information received from the outside into picture information with the higher resolution than that thereof.

In addition, according to the present invention, an address decreasing means decreases the number of bits of an address from L bits to S bits, the address of L bits being a class code that is output from a class determining means that determines the class of a second digital picture signal to be predicted corresponding to a pattern of first picture data. Since the address decreasing means decreases the number of bits of the address from L bits to S bits, the coefficient data stored in the coefficient memory can be decreased. In other words, the hardware scale can be further reduced.

In addition, the present invention is a sum-of-products calculating method for adding products of multipliers and multiplicands so as to calculate operations of a digital filter with M taps, comprising the steps of decreasing the number of bits of an address for controlling a multiplier memory from L bits to S bits, L being larger than S, reading multiplier data corresponding to the address of S bits from the multiplier memory, and generating the sum of products of the multiplier data that is read from the multiplier memory and multiplicand data.

BRIEF DESCRIPTION OF DRAWINGS

FIG. 6 is a table showing an address decreasing memory according to the embodiment of the present invention;

FIG. 7 is a table showing an address decreasing memory according to the embodiment of the present invention;

BEST MODES FOR CARRYING OUT THE INVENTION

Figure 1:
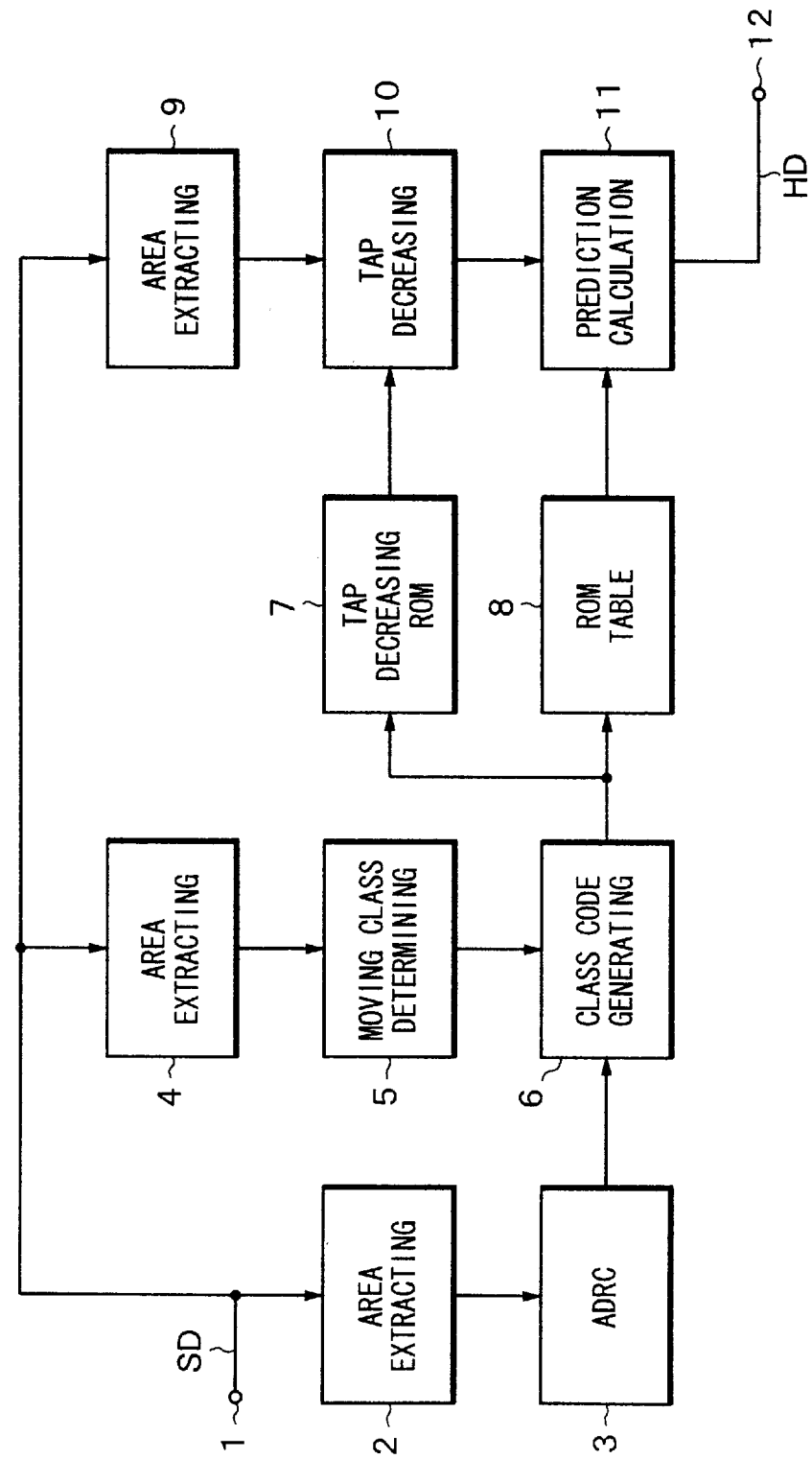
FIG. 1 is a block diagram showing a picture information converting apparatus according to an embodiment of the present invention.

Next, with reference to the accompanying drawings, an embodiment of the present invention will be described. FIG. 1 shows the structure of an embodiment according to the present invention. For example, a so-called NTSC picture signal is digitized and supplied as SD data from the outside to an input terminal 1.

Figure 2:
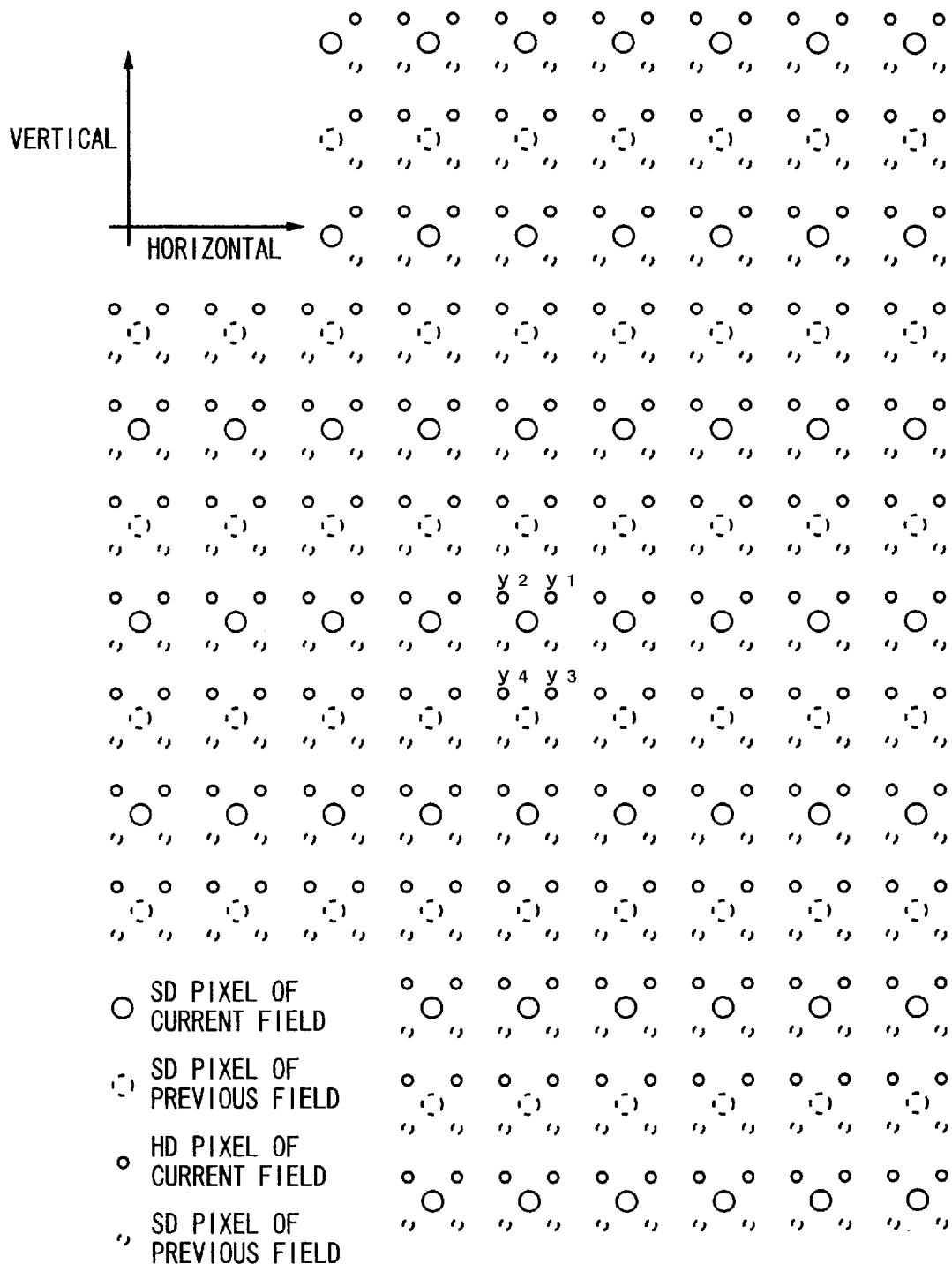
FIG. 2 is a schematic diagram for explaining the relation of positions of SD data and HD data.
Figure 3:
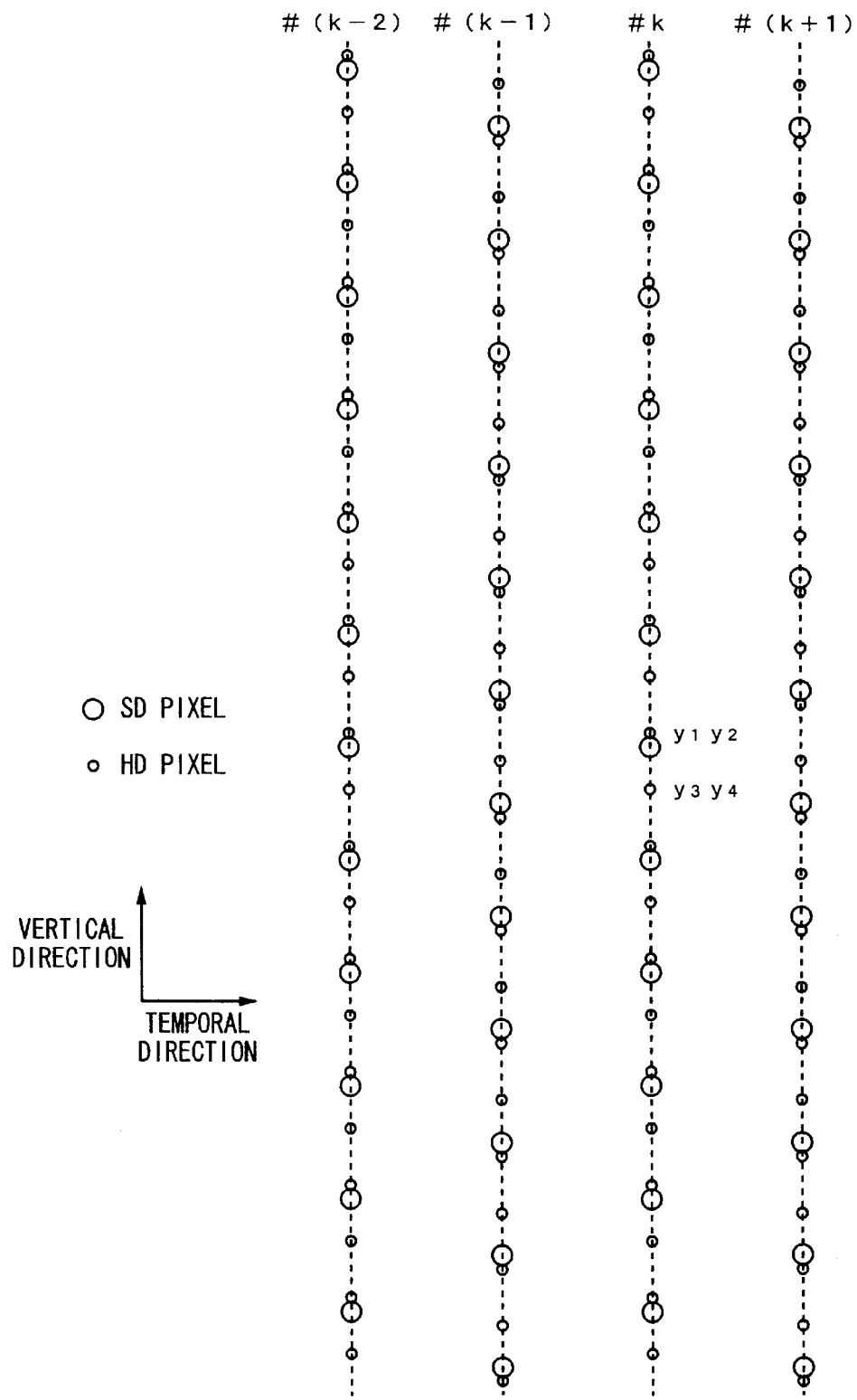
FIG. 3 is a schematic diagram for explaining the relation of positions of SD data and HD data.

FIGS. 2 and 3 show the relation of positions of SD pixels and HD pixels to be generated. FIG. 2 shows SD pixels and HD pixels of the current field and previous field in the horizontal direction and the vertical direction. FIG. 3 shows SD pixels and HD pixels in the temporal direction and vertical direction. Referring to FIG. 3, HD pixels to be generated are categorized as two types that are close-side HD pixels $y_1$ and $y_2$ and far-side HD pixels $y_3$ and $y_4$. The close-side HD pixels $y_1$ and $y_2$ are placed at positions close to relevant SD pixels. On the other hand, the far-side HD pixels $y_3$ and $y_4$ are placed at position far from relevant SD pixels. Hereinafter, a mode for predicting HD pixels placed at positions close to relevant SD pixels is referred to as mode 1. A mode for predicting HD pixels placed at positions far from relevant SD pixels is referred to as mode 2.

Figure 4:
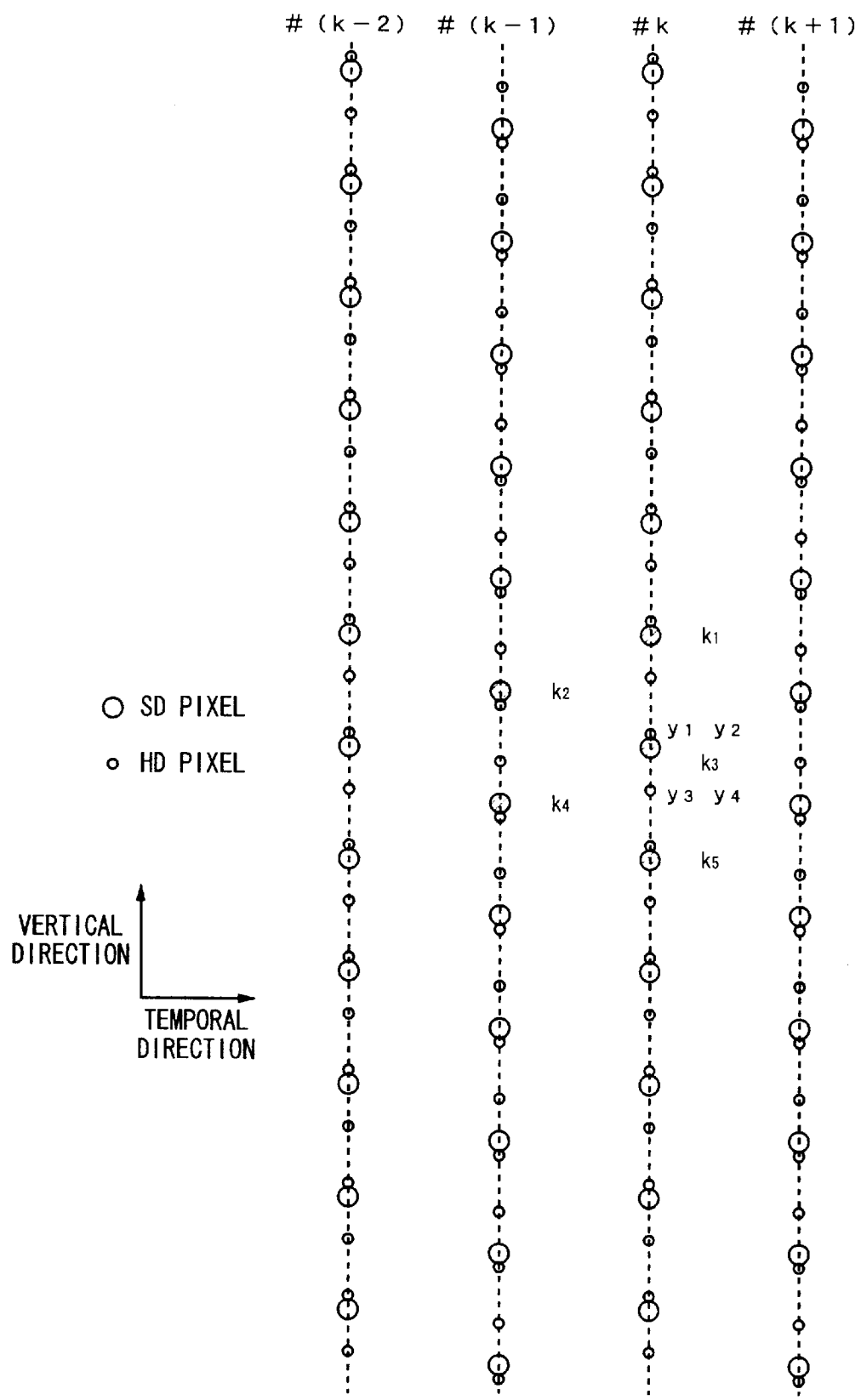
FIG. 4 is a schematic diagram for explaining data used for s spatial class categorization.

An area extracting circuit 2 extracts pixels necessary for performing a class categorization that represents a waveform in the space from the SD picture signal received from the input terminal 1. Hereinafter, this class categorization is referred to as a spatial class categorization. In this embodiment, as shown in FIG. 4, the area extracting circuit 2 extracts five SD pixels $k_1$ to $k_5$ placed in the vicinity of HD pixels $y_1$ and $y_2$ to be generated. The SD data extracted by the area extracting circuit 2 is supplied to an ADRC circuit 3.

The ADRC circuit 3 performs a calculation for compressing for example 8-bit SD data into 2-bit SD data so as to pattern a level distribution of the SD data in the area. The resultant pattern compressed data is supplied to a class code generating circuit 6.

Although the ADRC technique is an adaptive re-quantizing technique developed for encoding signals for VTRs in high performance, a local pattern of a signal level can be effectively represented with a short word length. Thus, in this embodiment, the ADRC technique is used to generate a code for the class categorization of the signal pattern. Assuming that the dynamic range of the area is denoted by DR, the number of bits assigned is denoted by n, the data level of the pixels in the area is denoted by L, and the re-quantized code is denoted by Q, the ADRC circuit equally divides the range between the maximum value MAX and the minimum value MIN of the pixels of the area by a predetermined bit length corresponding to the following formula (2) and re-quantizes the pixels.

$$DR = MAX - MIN + 1$$

$$Q = [(L - MIN + 0.5) \cdot 2n/DR] \qquad (2)$$

where [ ] represents a truncation process.

In this embodiment, it is assumed that five pixels of SD data separated by the area extracting circuit 2 is compressed to 2-bit data. The compressed SD data is denoted by $q_1$ to $q_5$.

Figure 5:
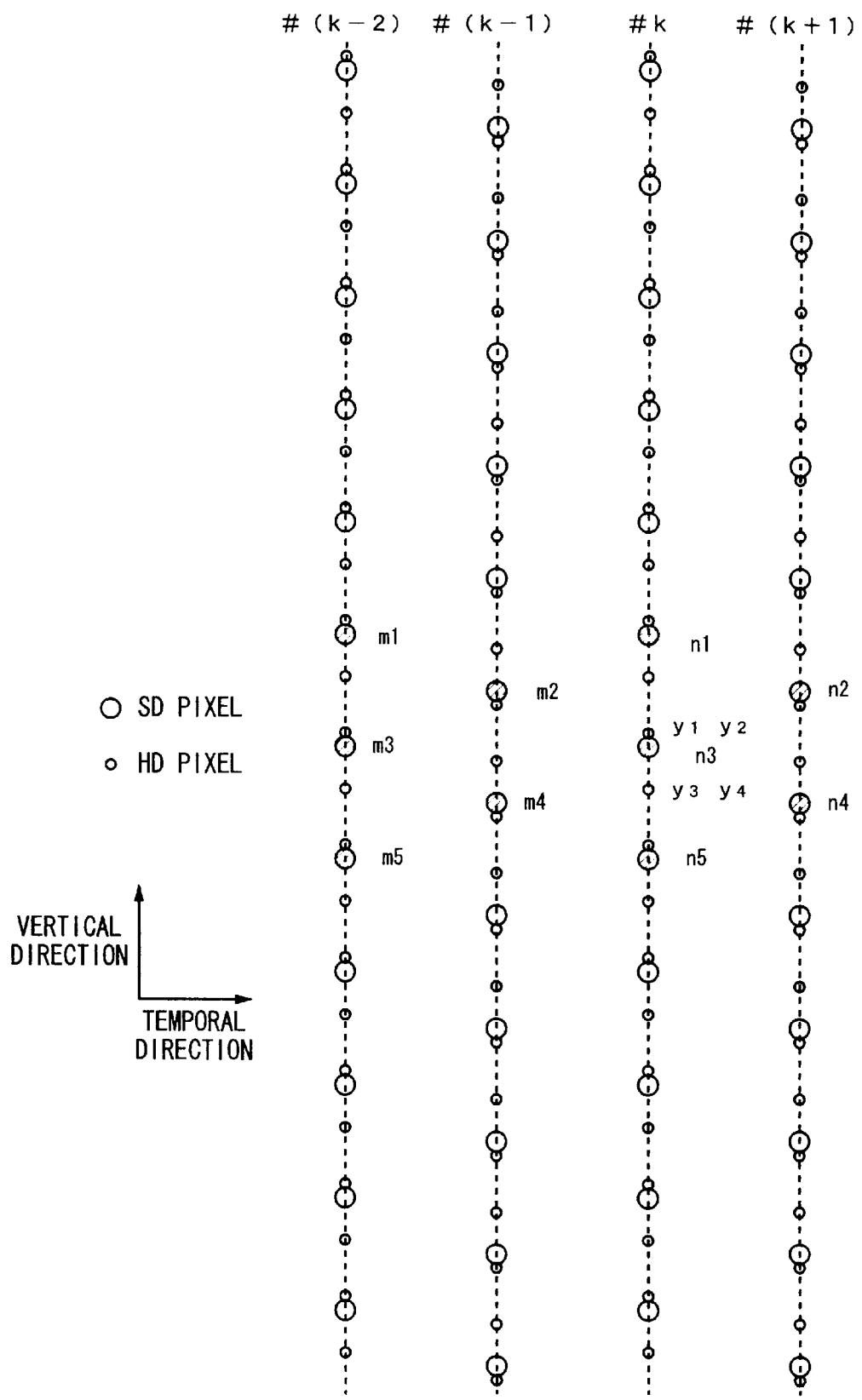
FIG. 5 is a schematic diagram for explaining data used for a moving class categorization.

On the other hand, the SD picture signal received from the input terminal 1 is also supplied to an area extracting circuit 4. The area extracting circuit 4 extracts pixels necessary for the class categorization that represents a moving degree of the picture (hereinafter, this class categorization is referred to as a moving class categorization). In this example, the area extracting circuit 4 extracts 10 SD pixels $m_1$ to $m_5$ and $n_1$ to $n_5$ at positions shown in FIG. 5 from the supplied SD picture signal corresponding to the HD pixels $y_1$ to $y_2$ to be generated.

The data extracted by the area extracting circuit 4 is supplied to a moving class determining circuit 5. The moving class determining circuit 5 calculates the differences of the supplied SD data between frames. The moving class determining circuit 5 calculates the average value of the absolute values of the obtained differences, limits the average value with a threshold value, and calculates a moving parameter of the picture. In reality, the moving class determining circuit 5 calculates the average value param of the absolute values of the differences of the supplied SD data corresponding to the following formula (3).

$$param = \frac{\sum_{i=0}^{n} |m_i - n_i|}{n} \qquad (3)$$

where n=5 in this embodiment.

With a predetermined threshold value for dividing a histogram of the average value param of the absolute values of the differences of the SD data by n, the moving class mv-class is calculated. In this embodiment, four moving classes are designated. When the average value param$\leq 2$, the moving class mv-class is designated 0. When the average value param$\leq 4$, the moving class mv-class is designated 1. When the average value param$\leq 8$, the moving class mv-class is designated 2. When the average value param>8, the moving class mv-class is designated 4. The resultant moving class mv-class is supplied to a class code generating circuit 6.

The class code generating circuit 6 performs the following equation (4) corresponding to pattern compressed data (spatial class) received from the ADRC circuit 3 and the moving class mv-class received from the moving class determining circuit 5, detects the class of the block, and supplies the class code class that represents the class to a tap decreasing ROM 7 and a ROM table 8. In other words, corresponding to the spacial class and moving class, the class code generating circuit 6 detects the class of the block with a smaller number of bits than the total number of bits thereof. The class code class represents the read address of the tap decreasing ROM 7 and the ROM table 8.

$$class = \sum_{i=1}^{n} q_i (2^p)^i + mv\_class \cdot 2^{pn} \qquad (4)$$

where n=5 and p=2 in this embodiment.

Alternatively, the class code generating circuit 6 may be composed of a data conversion table for decreasing the number of bits of a received class code from L bits to S bits. In this case, the class code generating circuit 6 reads a class code of S bits corresponding to a class code L-class of L bits. The resultant class code S-class represents addresses read from the ROM table 8 and the tap decreasing ROM 7.

FIG. 6 shows an example of a data conversion table that can be used for the class code generating circuit 6. A class code L-class is composed of for example seven bits. The class code of seven bits is composed of a class of two bits that represents the moving degree and a class of five bits that represents a waveform in the space. In this example, the class code of seven bits is decreased to a class code of six bits.

As shown in FIG. 6, a moving class mv-class is denoted by 0, 1, and 2. When the moving class mv-class is 0, before and after the class code is decreased, the number of addresses is not changed. When the moving class mv-class is 1 or 2, before and after the number of bits of the class code is decreased, the number of addresses is halved. Thus, when the number of bits of the class code is decreased, the total number of addresses is decreased from 96 to 64. Consequently, the addresses can be represented with six bits.

In addition, as shown in FIG. 7, the moving class mv-class can be denoted by 0, 1, 2, and 3. In this case, when the moving class mv-class is 0, 1, or 2, the number of addresses is described as with the above-described case. However, when the moving class mv-class is 3, the number of addresses is decreased in the same manner as the case that the moving class mv-class is 2. For example, when the number of addresses before the number of bits of the class code is decreased is 64, the number of addresses after the number of bits of the class code is decreased becomes 48. Likewise, when the number of addresses before the number of bits of the class code is decreased is 96, the number of addresses after the number of bits of the class code is decreased becomes 48. When the number of addresses before the number of bits of the class code is decreased is 84, the number of addresses after the number of bits of the class code is decreased becomes 58. Likewise, when the number of addresses before the number of bits of the class code is decreased is 116, the number of addresses after the number of bits of the class code is decreased becomes 58.

Figure 8:
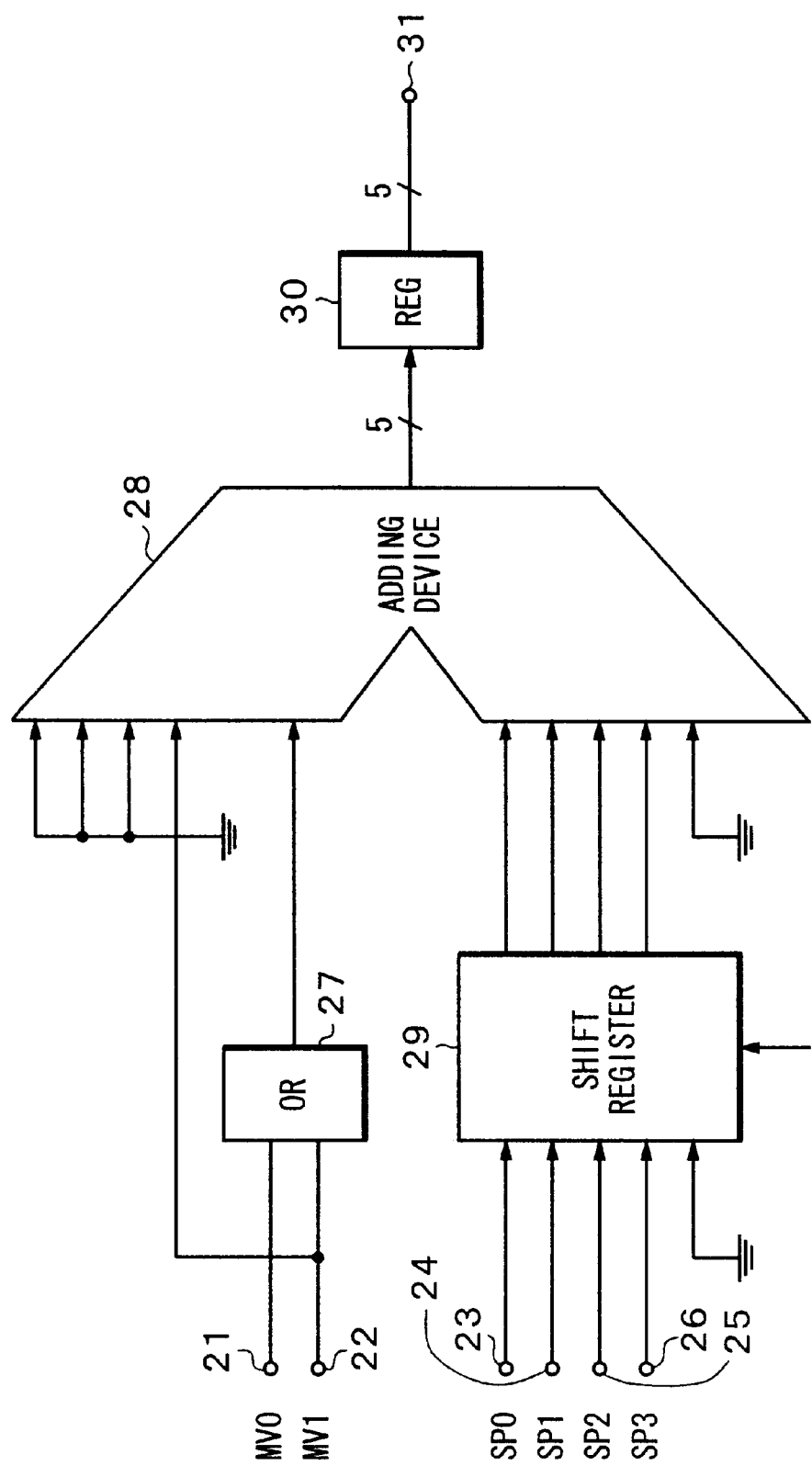
FIG. 8 is a circuit diagram showing an address decrease calculating circuit according to an embodiment of the present invention.
Figure 9:
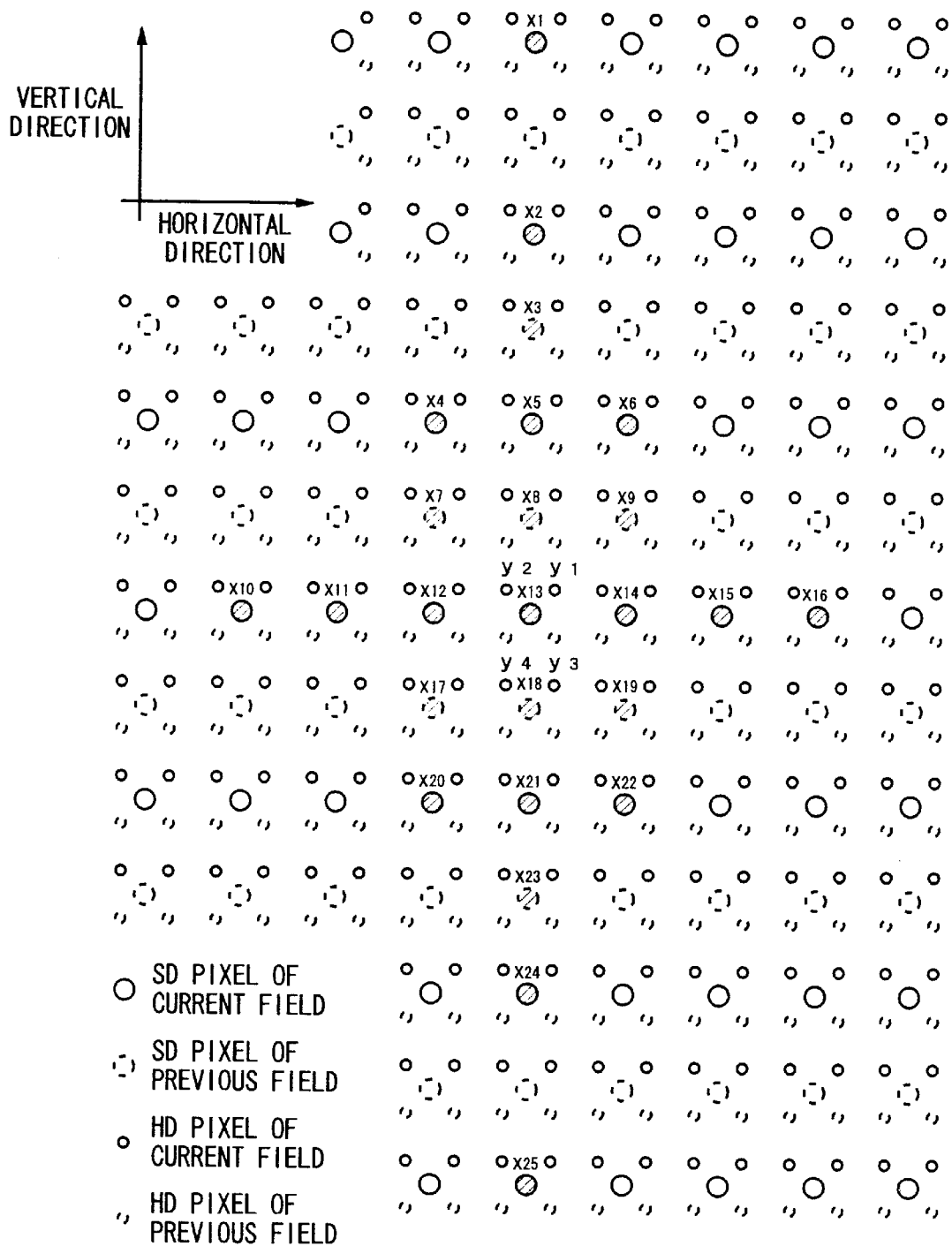
FIG. 9 is a schematic diagram for explaining pixels for a prediction calculation.

The class code generating circuit 6 has the decreasing memory as mentioned above and can decrease a class code by the decrease calculating circuit. FIG. 8 shows a circuit diagram of the decrease calculating circuit. The moving class mv-class is received from the input terminals 21 and 22 and is input to the ALU(the adding device). The LSB of the spatial class is received from an input terminal 23. The 2nd-LSB of the spatial class is received from an input terminal 24. The 3rd-MSB of the spatial class is received from an input terminal 25. The 2nd-MSB of the spatial class is received from an input terminal 26. The MSB of the spatial class is received from an input terminal 27. The bits of the input terminals 23, 24, 25, 26 and 27 are supplied to a shift register 29.

The MSB on the input side of the shift register 29 is grounded. The bit of the MSB of the spatial class is supplied to the 2nd-MSB on the input side of the shift register 29. The 2nd-MSB of the spatial class is supplied to the 3rd-LSB on the input side of the shift register 29. The 2nd-LSB of the spatial class is supplied to the 2nd-LSB on the input side of the shift register 29. The LSB of the spatial class is supplied to the LSB on the input side of the shift register 29.

A control signal for controlling a shift by N bits is supplied to the shift register 29. The control signal corresponds to the moving class mv-class. In this embodiment, a control signal for a shift by one bit is supplied. When the moving class mv-class is 0, the shift register 29 supplies the low order four bits to the other input side of the adding device 28. When the moving class mv-class is not 0, the supplied bits are shifted by one bit each to the LSB side. The shift by one bit causes the output of the shift register 29 to become the half of the input thereof. The shifted four-bit data is supplied to the other input side of the adding device 28. The MSB on the other input side of the adding device 28 is grounded. The adding device 28 adds data on the first input side and data on the second input side and supplies the resultant data of five bits to an output terminal 31 through a register 30.

As described above, in the conventional class categorized picture information converting apparatus, pixel data $x_1$ to $x_n$ received from the area extracting circuit 9 and predetermined coefficient data $w_1$ to $w_n$ that are read from the ROM table 8 with a read address that is the class code class determined by the class code generating circuit 6 are multiplied by a prediction calculating circuit corresponding to the above-described formula (1) so as to convert SD picture data into HD picture data. When the value n is increased for improving the converting performance, the circuit scale of both the ROM table 8 and the prediction calculating circuit 11 become large. Thus, the picture conversion cannot be accomplished with small hardware.

When the value n in the formula (1) is large (in other words, many taps are used), for example, the following coefficients are used.

−0.0484, −0.0748, +0.1297, +0.0532, −0.0810, +0.1875, −0.3679, +1.5571, +0.2390, −0.0400, +0.0125, −0.0076, −0.3310, −0.1554, +0.0344, −0.2683, +0.0384, +0.2333, −0.0576, −0.0084

It is clear that many of these coefficient data are small and similar values that are the same as absolute values. Thus, according to the present invention, the number of taps is decreased so that coefficient data whose absolute values are similar are integrated and thereby SD pixel data corresponding to original coefficient data contained in the integrated coefficients are integrated. The resultant integrated pixel data is used in the prediction calculation. In addition, with the integrated coefficient data that has been learnt with the integrated pixel data, the following prediction calculation is performed.

$$y = wn_1 x(x_1+x_7-x_{11}) + wn_2 x(-x_2+x_{23}) + wn_3 x(x_4-x_8) + \ldots + wn_{nn} x(x_3 - x_{18}) \quad (5)$$

where nn is a natural number smaller than n; and wn is integrated coefficient data.

A method for generating integrated coefficient data will be described later. With the integrated coefficient data, the number of taps can be remarkably decreased without a deterioration of the performance. Thus, the picture information converting apparatus that has a high performance can be accomplished with a small hardware scale.

The tap decreasing ROM 7 to which the output signal of the class code generating circuit 6 stores as additional code data the information for generating the integrated pixel data (for example, $(x_1+x_7-x_{11})$ in the formula (5)). In reality, the tap decreasing ROM 7 stores the additional code data that is composed of information that represents the relation between pixel data and integrated coefficient data to be multiplied (for example, $wn_1$ in the formula (5)) and a plus/minus sign. The additional code data is designated for each class. The additional code data for generating the integrated pixel data of the class is read from the tap decreasing ROM 7 corresponding to the address represented by the class code class. The additional code data is supplied to a tap decreasing circuit 10.

In addition, the input SD data is supplied to the area extracting circuit 9. The area extracting circuit 9 extracts 25 SD data $x_1$ to $x_{25}$ at positions as shown in FIG. 6. The 25 SD data $x_1$ to $x_{25}$ are used for the prediction calculation. An output signal of the area extracting circuit 9 is supplied to the tap decreasing circuit 10. The tap decreasing circuit 10 converts the received 25 SD data into for example eight integrated pixel data corresponding to the additional data received from the tap decreasing ROM in the method or by the feature according to the present invention.

The other ROM table 8 to which the output signal of the class code generating circuit 6 is supplied stores integrated coefficient data (for example, $wn_1$ in the formula (5)). As with the ROM table of the conventional class categorized picture information converting apparatus, the ROM table 8 stores integrated coefficient data for each class. The integrated coefficient data is used to calculate HD data with the integrated pixel data corresponding to the linear prediction equation by learning the relation between the pattern of the integrated pixel data and the HD data. The integrated coefficient data is information for converting SD data (integrated pixel data) into HD data that has a higher resolution than that thereof (in other words, the HD data corresponds to the so-called high-vision standard). In this example, the integrated coefficient data is provided for each of the mode 1 and mode 2. A method for creating the integrated coefficient data stored in the ROM table 8 will be described later. $wn_i$ (class) is read from the ROM table 8 corresponding to the address represented by the class code class. $wn_i$ is the integrated coefficient data of the class. The integrated coefficient data is supplied to a prediction calculating circuit 11.

The prediction calculating circuit 11 calculates HD data corresponding to the input SD data with the eight integrated pixel data received from the tap decreasing circuit 10 and the integrated coefficient data received from the ROM data table 8.

Assuming that the integrated pixel data is denoted by $xn_1$ to $xn_8$ and the integrated coefficient data is denoted by $wn_1$ to $wn_8$, the prediction calculating circuit 11 performs the calculation expressed by the formula (6) with the integrated pixel data $xn_1$ to $xn_8$ received from the tap decreasing circuit 10, the integrated coefficient data $wn_1$ to $wn_8$ received from the ROM table 8, and a coefficient for block 1 in the mode 1 (for block 2 in the mode 2). Thus, HD data hd' corresponding to the input SD data is calculated. The created HD data hd' is output from an output terminal 12. The HD data that is output from the output terminal 12 is supplied to for example an HD TV receiver, an HD video tape recorder, or the like.

$$hd' = wn_1 \times n_1 + wn_2 \times n_2 + \ldots + wn_8 \times n_8 \quad (6)$$

According to the system of the present invention, coefficient data that has similar values as absolute values is integrated. In addition, SD pixel data is integrated and treated as integrated pixel data. With the integrated pixel data learnt, integrated coefficient data is obtained. The sizes of the coefficient data stored in the ROM table and the prediction calculating circuit can be much reduced. In this case, although it is necessary to newly provide the tap decreasing ROM and the tap decreasing circuit, the increase of the hardware of the tap decreasing ROM and the tap decreasing circuit is much smaller than the decrease of the hardware of the circuit for calculating the coefficient data and the prediction calculation.

Next, with reference to FIGS. 10, 11, and 12, a method for learning the additional code data stored in the tap decreasing ROM 7 and the integrated coefficient data stored in the ROM table 8 will be described. Since the circuit shown in FIG. 10 is the same as the circuit in the conventional system, the circuits shown in FIGS. 11 and 12 have features of the present invention.

Figure 10:
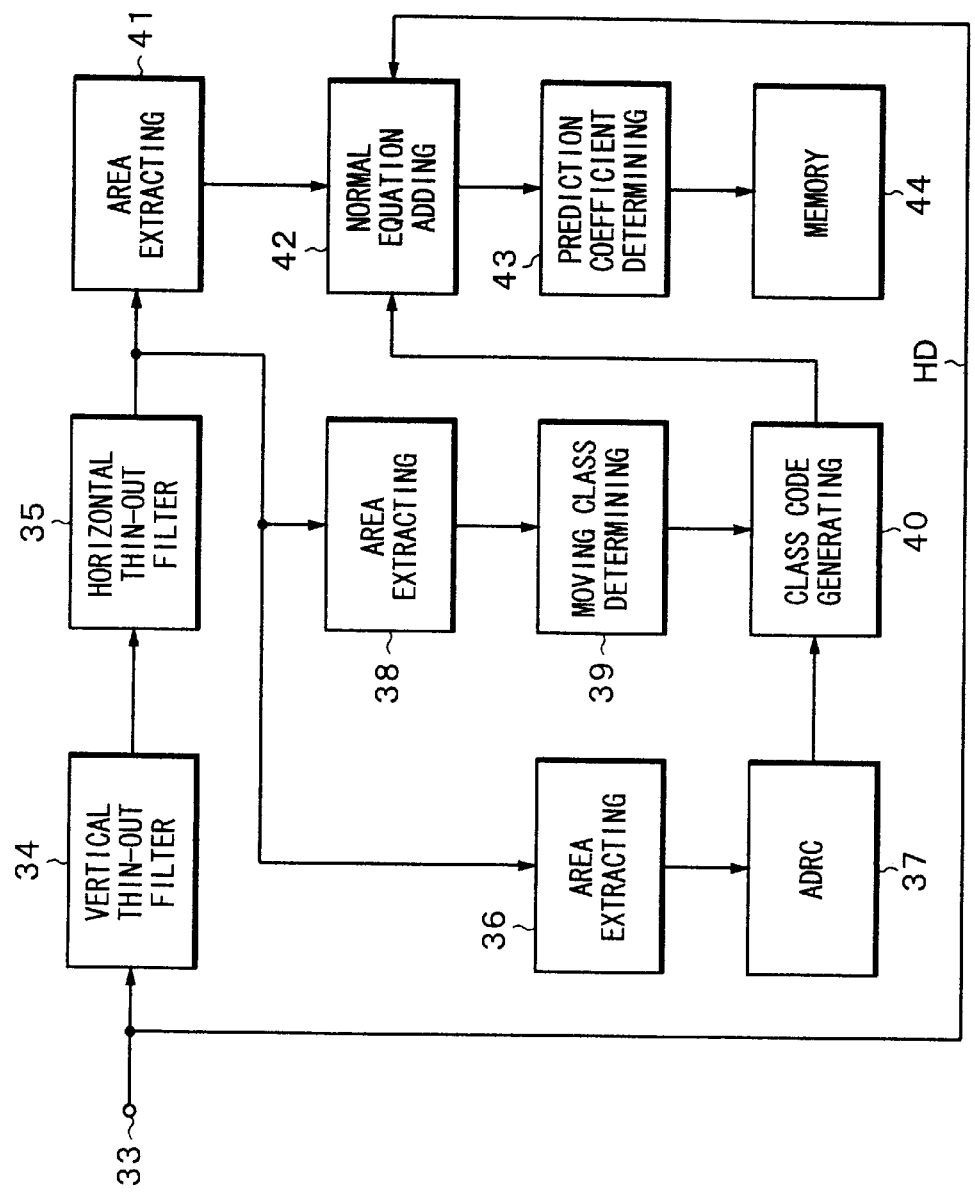
FIG. 10 is a schematic diagram for explaining the creation of a compensation data table.

As shown in FIG. 10, to learn coefficient data, an SD picture corresponding an HD picture is formed in such a manner that the number of pixels of the SD picture is ¼ of that of the HD picture. HD data is received from an input terminal 33. The pixels in the vertical direction of the received HD data are thinned out by a vertical thin-out filter 34 so that the frequency in the vertical direction in the field is halved. A horizontal thin-out filter 35 thins out the pixels in the horizontal direction.

The resultant SD data is supplied to area extracting circuits 36, 38, and 41. On the other hand, the HD data received from the input terminal 33 is supplied to a normal equation adding circuit 42. The area extracting circuit 36 extracts required pixels from the received SD picture signal so as to perform a spatial class categorization. In reality, the operation of the area extracting circuit 36 is the same as the operation of the area extracting circuit 36 that was described previously. The extracted SD data is supplied to an ADRC circuit 37.

The ADRC circuit 37 detects a pattern of a one-dimensional or two-dimensional level distribution of the SD data received for each area. In addition, the ADRC circuit 37 performs a calculation for compressing all or part of data of each area from 8-bit SD data to 2-bit SD data. Thus, the ADRC circuit 37 forms pattern compressed data and supplies the data to a class code generating circuit 40. The structure of the ADRC circuit 37 is the same as the structure of the ADRC circuit 3.

On the other hand, the area cutting circuit 38 extracts required data from the SD picture signal for a moving class categorization. In reality, the operation of the area extracting circuit 38 is the same as the operation of the area extracting circuit 4 that was described previously. The SD data extracted by the area extracting circuit 28 is supplied to a moving class determining circuit 29. In reality, the operation of the moving class determining circuit 29 is the same as the operation of the moving class determining circuit 5 that was described previously. The moving class determined by the moving class determining circuit 29 is supplied to a class code generating circuit 40.

The structure of the class code generating circuit 40 is the same as the structure of the class code generating circuit 6 that was described previously. The class code generating circuit 40 performs the calculation expressed by the formula (4) corresponding to the pattern compressed data (spatial class) received from the ADRC circuit 37 and the moving class mv-class received from the moving class determining circuit 40. Thus, the class code generating circuit 40 detects the class of the current block and outputs a class code that represents the class. The class code generating circuit 40 outputs the class code to the normal equation adding circuit 42.

On the other hand, the area extracting circuit 41 extracts SD pixel data used for a prediction calculation from the SD signal. In reality, the structure of the area extracting circuit 41 is the same as the structure of the area extracting circuit 9 that was described previously. The area extracting circuit 41 extracts required SD pixels for the linear prediction equation corresponding to the moving class mv-class. An output signal of the area extracting circuit 41 is supplied to the normal equation adding circuit 42. When a delaying circuit is disposed at the immediately preceding stage of the area extracting circuit 41, the timing of data supplied from the area extracting circuit 41 to the normal equation adding circuit 42 can be adjusted.

Next, to explain the operation of the normal equation adding circuit 42, a learning operation of a converting equation for converting a plurality of SD pixels into an HD pixel and a signal converting operation using the prediction equation will be described. In the following, a general case for predicting n pixels will be described. Now, it is assumed that levels of SD pixels are denoted by $x_1, x_2, \ldots, x_n$ and re-quantized data of which these levels are processed by p-bit ADRC are denoted by $q_1, q_2, \ldots, q_n$. At this point, the class code class of this area is defined with the formula (4).

Assuming that the levels of SD pixels are denoted by $x_1, x_2, \ldots, x_n$ and the level of an HD pixel is denoted by y, the linear prediction equation with n taps of coefficients $w_1, w_2, \ldots, w_n$ for each class is given by the previously described formula (1). Before the learning, $w_i$ is a non-designated coefficient.

A plurality of signal data are learnt for each class. When the number of data is m, the following formula (7) is designated corresponding to the formula (1).

$$y_k = w_1 x_{k1} + w_2 x_{k2} + \ldots + w_n x_{kn} \tag{7}$$

(where k=1, 2, . . . , m)

When m>n, $w_1, w_2, \ldots, w_n$ are not uniquely obtained. Thus, the elements of an error vector e are defined by the formula (8). With the formula (8), coefficients that minimize the value of the formula (9) are obtained. In other words, a solution is made by the method of least squares.

$$e_k = y_k - \{w_1 x_{k1} + w_2 x_{k2} + \ldots + w_n x_{kn}\} \tag{8}$$

(where k=1, 2, . . . , m)

$$e^2 = \sum_{k=0}^{m} e_k^2 \tag{9}$$

Next, partial differential coefficients of the formula (9) with respect to $w_i$ are obtained. In other words, $w_i$ are obtained so that the formula (10) becomes 0.

$$\frac{\partial e^2}{\partial w_i} = \sum_{k=0}^{m} 2\left(\frac{\partial e_k}{\partial w_i}\right) e_k = \sum_{k=0}^{m} 2 x_{ki} \cdot e_k \tag{10}$$

Next, $X_{ji}, Y_i$ are defined so that the formulas (11) and (12) are satisfied. The formula (10) can be expressed as a matrix with the formula (13).

$$X_{ji} = \sum_{p=0}^{m} x_{pi} \cdot x_{pj} \tag{11}$$

-continued $$Y_i = \sum_{k=0}^{m} x_{ki} \cdot y_k \quad (12)$$

$$\begin{bmatrix} X_{11} & X_{12} & \cdots & X_{1n} \\ X_{21} & X_{22} & \cdots & X_{2n} \\ \cdots & \cdots & \cdots & \cdots \\ X_{n1} & X_{n2} & \cdots & X_{nn} \end{bmatrix} \begin{bmatrix} W_1 \\ W_2 \\ \cdots \\ W_n \end{bmatrix} = \begin{bmatrix} Y_1 \\ Y_2 \\ \cdots \\ Y_n \end{bmatrix} \quad (13)$$

This equation is normally referred to as a normal equation. The normal equation adding circuit 42 performs additions with the class code class received from the class code generating circuit 40, the SD data $x_1, x_2, \ldots, x_n$ received from the area extracting circuit 42, and the HD pixel level y corresponding to the SD data received from the input terminal 33.

After all training data have been input to the normal equation adding circuit 42, it outputs normal equation data to a prediction coefficient determining circuit 43. The prediction coefficient determining circuit 43 solves the normal equation by a conventional matrix solution such as sweep-out method with respect to $w_i$ and calculates prediction coefficients. The prediction coefficient determining circuit 43 writes the calculated prediction coefficients to a memory 44.

After the above-described training operation has been performed, prediction coefficients for predicting target HD data y that is statistically closest to the true value for each class is stored in the memory 44. However, when the converting performance is important, the number of taps increases. Thus, the circuit scales of the ROM that stores the coefficient data and the prediction calculating circuit become large.

The picture information converting apparatus according to the present invention generates additional code data stored in the tap decreasing ROM 7 with the prediction coefficients (coefficient data) obtained by the above-described method and stored in the memory 44. As was described previously, prediction coefficients for each class are stored in the memory 44. However, as described previously, coefficient data whose absolute values are similar stored in the memory 44. Coefficient data whose absolute values are similar is decreased. The SD pixel data is integrated corresponding to the decreased coefficient data and treated as integrated pixel data. With the integrated pixel data, the learning operation is performed and thereby integrated coefficient data is decreased.

First of all, assuming that coefficient data is $w_1$ to $w_{17}$ and temporary integrated coefficient data is $wn_1$ to $wn_7$, temporary integrated coefficient data is selected so that the sum of the absolute values of the differences between the coefficient data and the temporary integrated coefficient data becomes the minimum. With the temporary integrated coefficient data and the coefficient data, additional code data composed of the information representing the relation between the SD pixel data corresponding to coefficient data and the temporary integrated coefficient data to be multiplied and plus/minus sign of the coefficient data is generated. The additional code data for each class is stored in the tap decreasing ROM. Next, with reference to FIG. 11, an example of a process for generating the additional code data stored in the tape decreasing ROM will be described.

Figure 11:
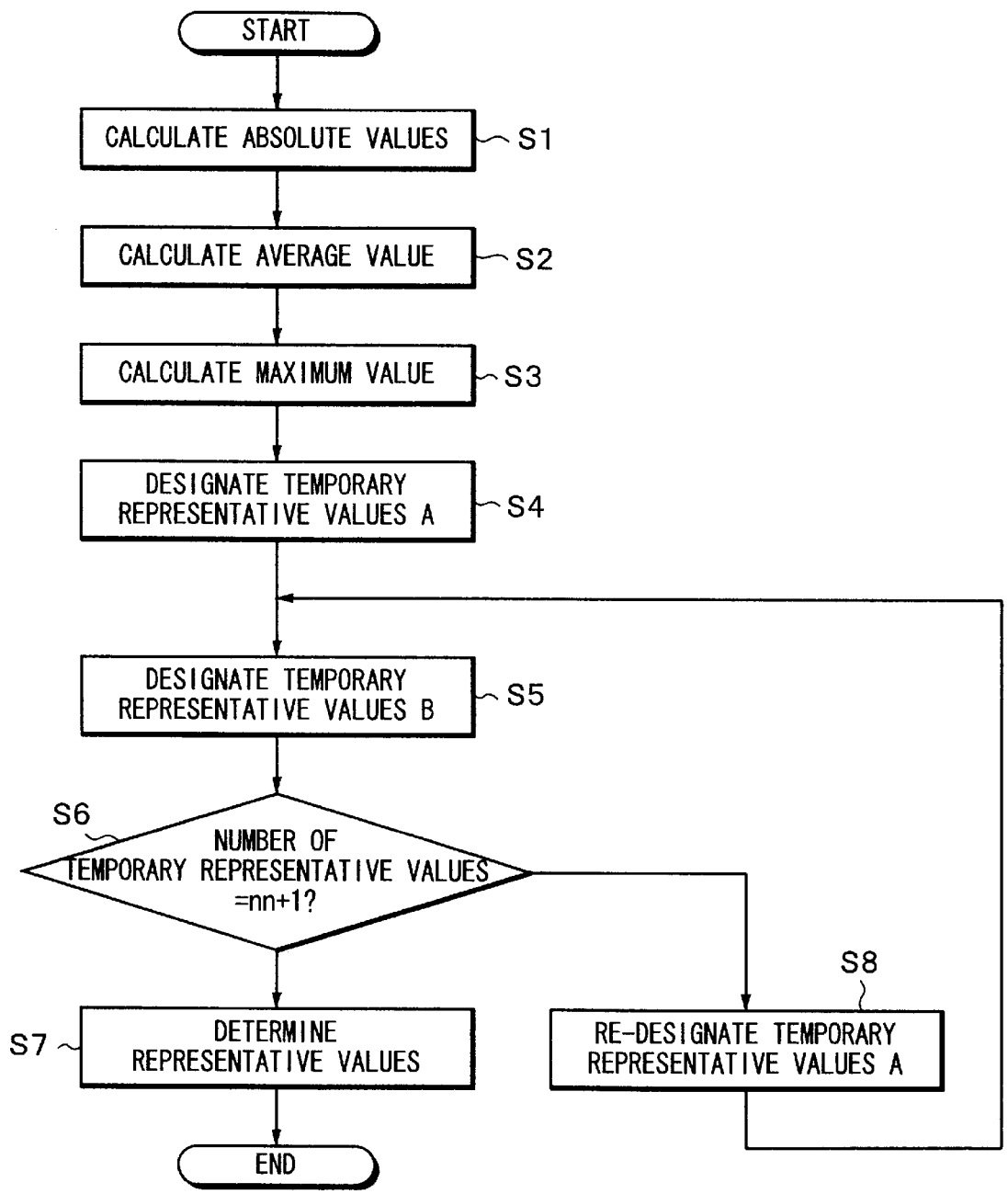
FIG. 11 is a flow chart showing a tap decreasing process according to the present invention.

FIG. 11 is a flow chart showing the process for generating the additional code data. At step S1, the absolute values of n coefficient data are calculated. At step S2, the average value of the n coefficient data is calculated. At step S3, the maximum value of the absolute values of the n coefficient data is calculated. At step S4, the average value calculated at step S2, the maximum value calculated at step S3, and 0.0 are designated as temporary representative values A.

At step S5, it is determined to which of the temporary representative values A each of the absolute values of the n coefficient data is the closest. Thus, three groups corresponding to the temporary representative values A are generated. The average values of the individual groups are obtained. The obtained average values (three values) are designated as new temporary representative values B. At this point, 0.0 of the temporary representative values A is always 0.0. At step S6, it is determined whether or not the number of the temporary representative values B is nn+1. When the number of the temporary representative values B is nn+1 (namely, the determined result at step S6 is Yes), the flow advances to step S7. When the number of the temporary representative values B is not nn+1 (namely, the determined result at step S6 is No), the flow advances to step S8.

At step S8, it is determined to which of the temporary representative values B designated at step S5 each of the absolute values of the n coefficient data. Thus, groups of the absolute values of the n coefficient data corresponding to the temporary representative values B are generated. The maximum difference between the coefficient data of each group and the relevant member of the temporary representative values B is calculated. A member with the maximum difference is selected from the temporary representative values B. The value of the selected member is added to ±0.0001 and divided into two values. The two values are re-designated as new temporary representative values A. In other words, the number of the temporary representative values is increased by 1. At step S7, the value 0.0 is removed from the (nn+1) temporary representative values B. Thus, the nn temporary representative values B are determined as final representative values.

Next, with real values, the flow chart of the process shown in FIG. 11 will be described. In this example, the number of coefficient data is 17 (namely, n=17) and the number of temporary representative values is 7 (namely, nn=7). First of all, the 17 coefficient data and the corresponding values are shown in the following.

| | |
|---|---|
| [0] | 0.078855008 |
| [1] | −0.014829520 |
| [2] | −0.201679692 |
| [3] | −0.006243910 |
| [4] | 0.189737246 |
| [5] | −0.048766851 |
| [6] | 0.121056192 |
| [7] | −0.237494633 |
| [8] | 1.291100144 |
| [9] | 0.260707706 |
| [10] | −0.063144088 |
| [11] | 0.016828740 |
| [12] | −0.475499421 |
| [13] | 0.031004170 |
| [14] | 0.054794021 |
| [15] | −0.026714571 |
| [16] | 0.034312069 |

At step S1, the absolute values of the 17 coefficient data are calculated. At step S2, the average value of the absolute values of the coefficient data is calculated. The average value is 0.1854569. At step S3, the maximum value of the absolute values of the coefficient data is calculated. The maximum value is 1.2911001. At step S4, the average value, the maximum value, and 0.0 are designated as temporary representative values A. In the following description, for simplicity, the temporary representative values A and B are followed by suffixes. The temporary representative values A1 are as follows.

(Temporary representative value A1): 0.0, 0.1854569, 1.2911001

At step S5, the differences between the absolute values of the coefficient data and the temporary representative values A1 are obtained. The absolute values are grouped corresponding to the closest temporary representative values. The average value of each group is calculated. Thus, temporary representative values B1 are designated. The temporary representative values B1 (three values) are as follows:

(Temporary representative values B1): 0.0, 0.2476958, 1.2911001

At step S6, it is determined whether or not the number of temporary representative values B is nn+1. In this example, since the number of temporary representative values B1 is not eight, the flow advances to step S8. At step S8, the differences between the absolute values of the coefficient data and the temporary representative values A1 are obtained. The absolute values are grouped corresponding to the closest temporary representative values. A member with the maximum difference is selected from the temporary representative values B. The value of the selected member is added to ±0.0001. In this example, 0.0 is a member with the maximum difference. Thus, ±0.0001 is added to 0.0. With the resultant values and the remaining temporary representative values B1, temporary representative values A2 are designated. The temporary representative values A2 are as follows:

(Temporary representative values A2): −0.0001000, 0.0001000, 0.2476958, 1.2911001

At step S5, the same process as described above is performed. Thus, temporary representative values B2 that are composed of four values are designated. The temporary representative values B2 are as follows:

(Temporary representative values B2): 0.0, 0.0451408, 0.273237, 1.2911001

The flow advances to step S8 through step S6. At step S8, the same process as described above is performed. Thus, temporary representative values A3 composed of five values are designated. The temporary representative values A3 are as follows:

(Temporary representative values A3): 0.0, 0.0451408, 0.2729237, 0.2731237, 1.2911001

At step S5, the same process as described above is performed. Thus, temporary representative values B3 composed of five values are designated. The temporary representative values B3 are as follows:

(Temporary representative values B3): 0.0, 0.0573309, 0.2224048, 0.4754994, 1.2911001

The flow advances to step S8 through step S6. At step S8, the same process as described above is performed. Thus, temporary representative values A4 composed of six values are designated. The temporary representative values A4 are as follows:

(Temporary representative values A4): 0.0, 0.0572309, 0.0574309, 0.2224048, 0.4754994, 1.2911001

At step S5, the same process as described above is performed. Thus, temporary representative values B4 composed of six values are designated. The temporary representative values B4 are as follows:

(Temporary representative values B4): 0.0, 0.0422193, 0.0876851, 0.2224048, 0.4754994, 1.2911001

The flow advances to step S8 through the step S6. At step S8, the same process as described above is performed. Thus, temporary representative values A5 composed of seven values are designated. The temporary representative values A5 are as follows:

(Temporary representative values A5): 0.0, 0.0422193, 0.0876851, 0.2223048, 0.2225048, 0.4754994, 1.2911001

At step S5, the same process as described above is performed. Thus, temporary representative values B5 composed of seven values are designated. The temporary representative values B5 are as follows:

(Temporary representative values B5): 0.0, 0.0431226, 0.0999556, 0.1957085, 0.2491012, 0.4754994, 1.2911001

The flow advances to step S8 through step S6. At step S8, the same process as described above is performed. Thus, temporary representative values A6 composed of eight values are designated. The temporary representative values A6 are as follows:

(Temporary representative values A6): 0.0, 0.0430226, 0.0432226, 0.0999556, 0.1957085, 0.2491012, 0.4754994, 1.2911001

At step S5, the same process as described above is performed. Thus, temporary representative values B6 composed of eight values are designated. The temporary representative values B6 are as follows:

(Temporary representative values B6); 0.0, 0.0306769, 0.0555683, 0.0999556, 0.1957085, 0.2491012, 0.4754994, 1.2911001

At step S6, since it is determined whether or not the number of temporary representative values B6 is eight, the flow advances to step S7. The temporary representative values B6 and 17 coefficient data included in the groups are as follows:

| "0" | 1.2911001 | ... | [8] |
| "1" | 0.4754994 | ... | [12] |
| "2" | 0.2491012 | ... | [7] [9] |
| "3" | 0.1957085 | ... | [2] [4] |
| "4" | 0.0999556 | ... | [0] [6] |
| "5" | 0.0555683 | ... | [5] [10] [14] |
| "6" | 0.0306769 | ... | [11] [13] [15] [16] |
| "7" | 0.0000000 | ... | [1] [3] |

At step S7, 0.0 is removed from the temporary representative values B6. The resultant values are determined as final representative values.

Thus, it is determined in which of the seven temporary representative values B6 (temporary integrated coefficient data) the 17 coefficient data are included. The coefficient data included in the individual groups can be integrated. Thus, SD pixel data corresponding to the coefficient data can be also integrated. Consequently, the integrated pixel data can be generated. As a result additional code data composed of information representing in which of groups the coefficient data is included (namely, the relation between the coefficient data and the temporary representative values B to be multiplied) and plus/minus sign is generated.

The tap decreasing ROM to which the additional code data is stored is equivalent to the tap decreasing ROM 7 shown in FIG. 1 and a tap decreasing ROM 54 that will be described in the following.

The data generated in the above-described manner and stored in the memory 44 is coefficient data, not integrated coefficient data. Although the temporary integrated coefficient data that has been obtained corresponding to the flow chart shown in FIG. 11 may be used as integrated coefficient data, according to the present invention, a process for optimally generating integrated coefficient data is used. Next, such a process will be described.

Figure 12:
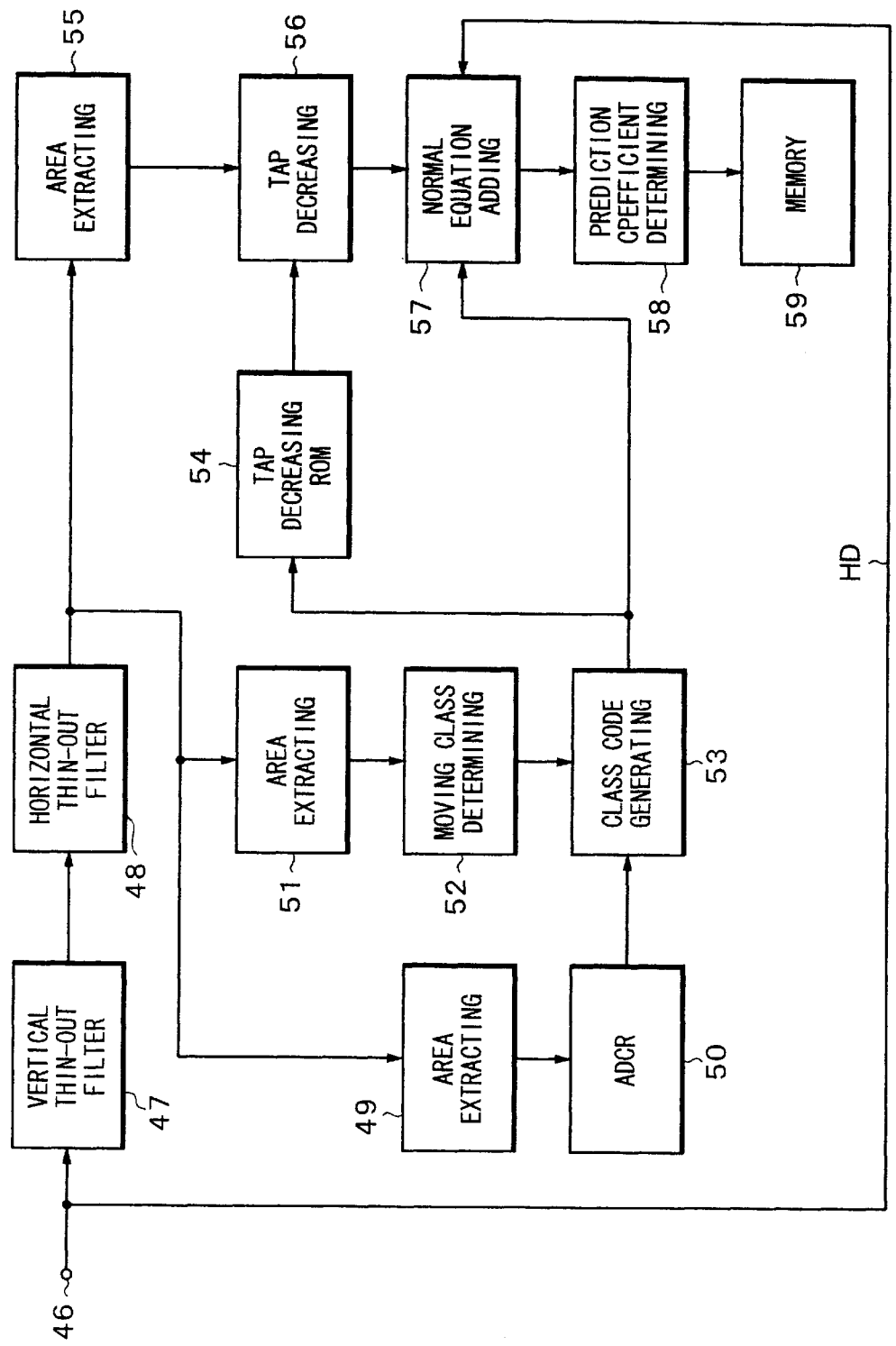
FIG. 12 is a schematic diagram for explaining the creation of a compensation data table.

As shown in FIG. 12, HD data is received from an input terminal 46. Pixels in the vertical direction of the received HD data are thinned out by a vertical thin-out filter 47 so that the frequency in the vertical direction in the field is halved. A horizontal thin-out filter 48 thins out pixels in the horizontal direction of the HD data. The vertical thin-out filter 47 is equivalent to the vertical thin-out filter 34. The horizontal thin-out filter 48 is equivalent to the vertical thin-out filter 35.

The SD pixel data is supplied to area extracting circuits 49, 51, and 55. For simplicity, in FIG. 12, portions similar to those in FIG. 10 are denoted by similar reference numerals and their description is omitted.

A class code generating circuit 53 outputs a class code class to a tap decreasing ROM 54 and a normal equation adding circuit 57. The tap decreasing ROM 54 is equivalent to the tap decreasing ROM 7. The process of the tap decreasing ROM 7 is performed corresponding to the flow chart shown in FIG. 11. Additional code data is read from the tap decreasing ROM 54 corresponding to the supplied class code class. As described previously, the additional code is composed of information for integrating SD pixel data and a plus/minus sign. The additional code data is supplied from the tap decreasing ROM 54 to a tap decreasing circuit 56.

On the other hand, SD pixel data used for performing a prediction calculation is extracted from the SD signal supplied to the area extracting circuit 55. In reality, the area extracting circuit 55 is equivalent to the above-described area extracting circuit 9. The area extracting circuit 55 extracts required pixel data necessary for a linear prediction equation corresponding to the moving class mv-class. An output signal of the area extracting circuit 55 is supplied to the tap decreasing circuit 56.

The tap decreasing circuit 56 integrates the SD pixel data extracted corresponding to the supplied additional code data into integrated pixel data. In reality, signs are placed to SD pixel data that can be integrated and the resultant SD pixel data is added. Thus, the integrated pixel data is generated. The generated integrated pixel data is supplied to a normal equation adding circuit 57.

Since the operations of the normal equation adding circuit 57, a prediction coefficient determining circuit 58, and a memory 59 are the same as those of the above-described normal equation adding circuit 42, the prediction coefficient determining circuit 43, and the memory 44, their description is omitted.

After the training operation has been performed as described above, prediction coefficients (integrated coefficient data) for predicting target HD data y for each class that is statistically the closest to a true value are stored in the memory 59. Thus, the integrated coefficient data for generating HD data with SD pixel data corresponding to a linear prediction equation has been learnt. The memory 59 is the ROM table 8 shown in FIG. 1.

Figure 13:
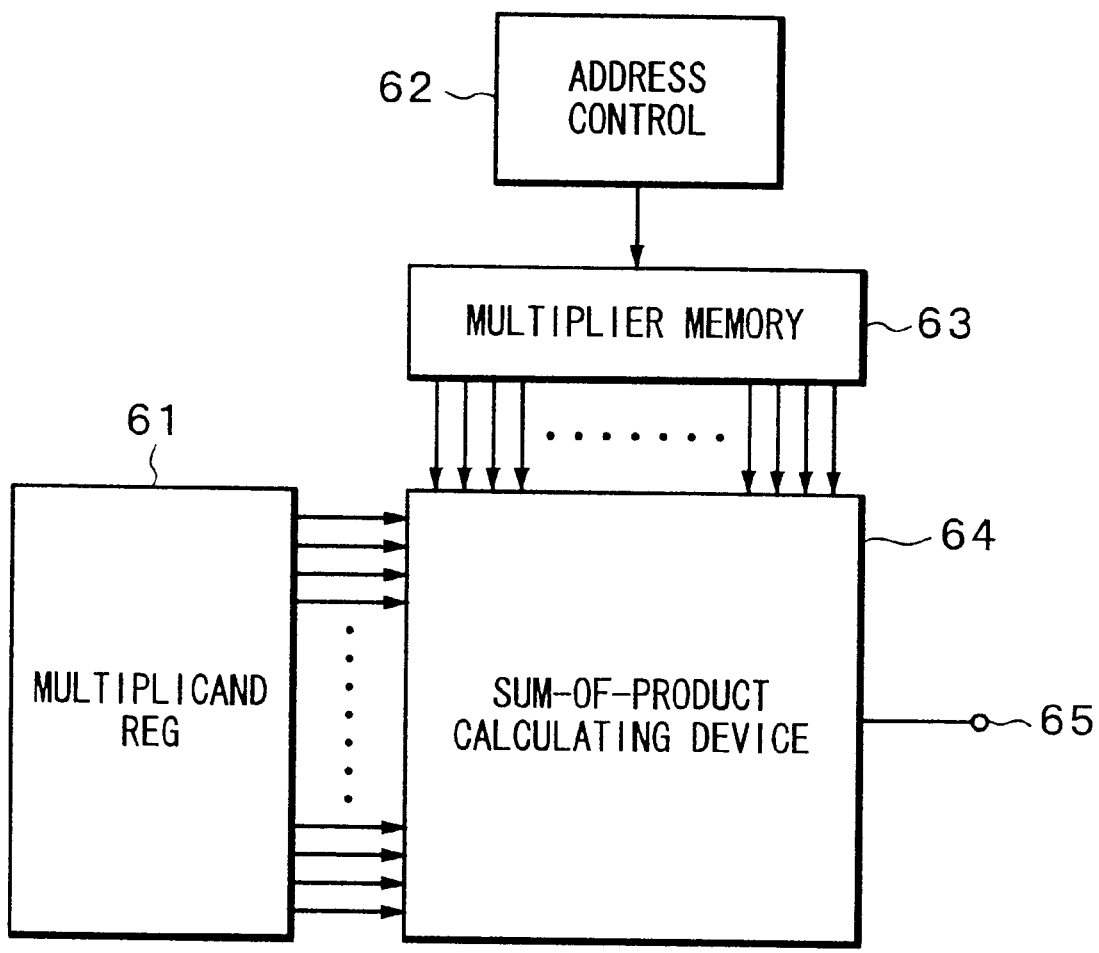
FIG. 13 is a circuit diagram showing an example of a prediction circuit.

FIG. 13 shows the structure of the prediction circuit according to the embodiment of the present invention, the number of taps of the prediction calculating circuit 11 not being decreased. For example, SD data is supplied as a multiplicand from a multiplicand register 61 to a sum-of-product calculating device 64. An address corresponding to the SD data is supplied from an address controlling circuit 62 to a multiplier memory 63. The multiplier memory 63 reads for example coefficient data corresponding to the supplied address. The coefficient data is supplied to the sum-of-product calculating circuit 64. The sum-of-product calculating device 64 executes a sum-of-product calculation expressed by the formula (1). The calculated result is supplied from an output terminal 65.

Figure 14:
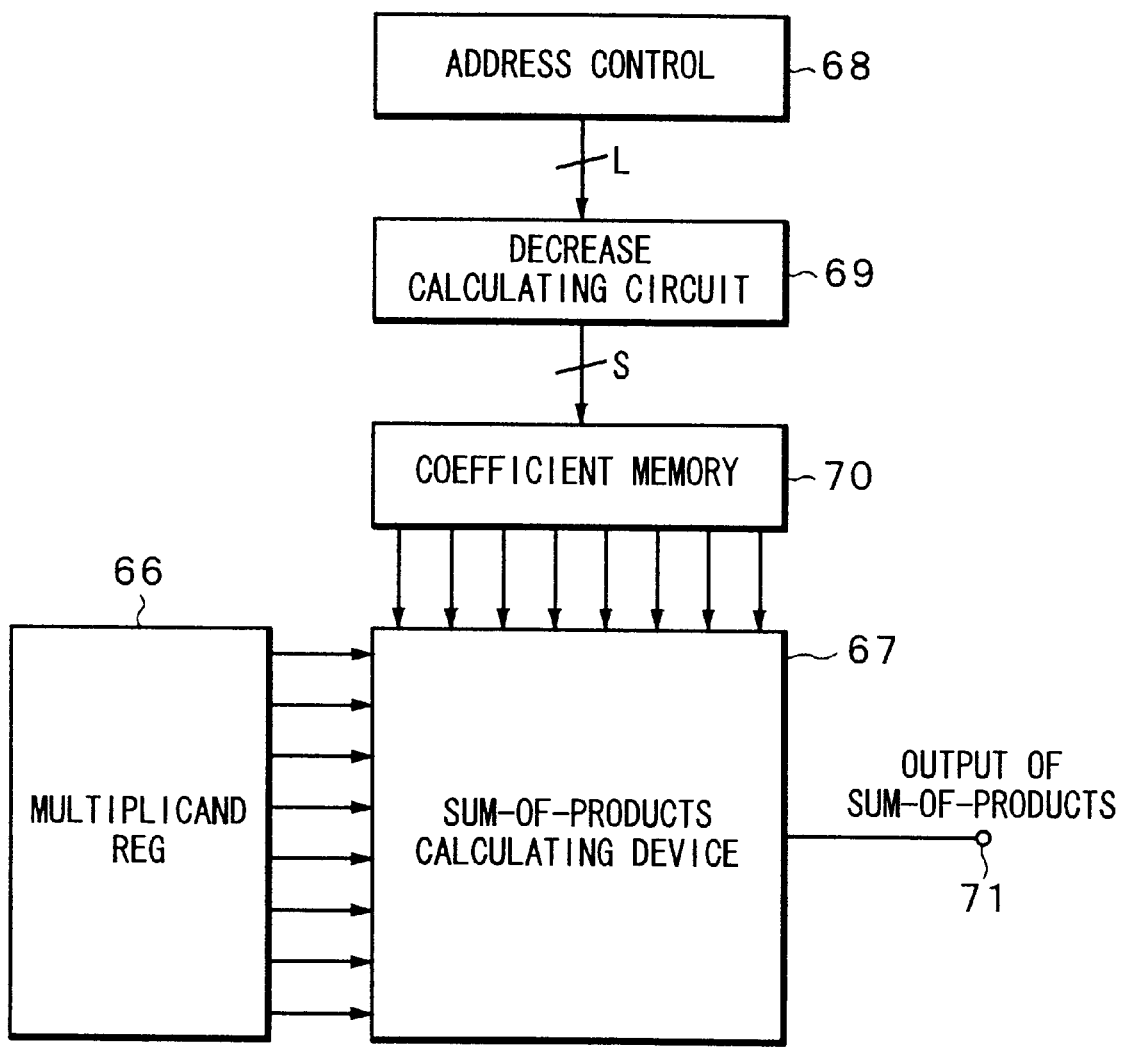
FIG. 14 is a circuit diagram showing a prediction circuit according to an embodiment of the present invention.

Next, FIG. 14 shows a prediction circuit according to an embodiment of the present invention. A multiplicand register 66 supplies a plurality of pixel data to a sum-of-product calculating device 67. An address controlling circuit 68 supplies a class code of L bits L-class to a decrease calculating circuit 69. As will be described later, the decrease calculating circuit 69 calculates operations for decreasing the number of bits of the class code of L bits L-class to a class code of S bits S-class. The resultant class code S-class is supplied from the decrease calculating circuit 69 to a coefficient memory 70. The coefficient memory 70 reads coefficient data corresponding to the class code S-class and supplies the class code to the sum-of-products calculating device 67. The sum-of-products calculating device 67 calculates the sum of products of pixel data and coefficient data and supplies the output of sum of products to an output terminal 71.

Figure 15:
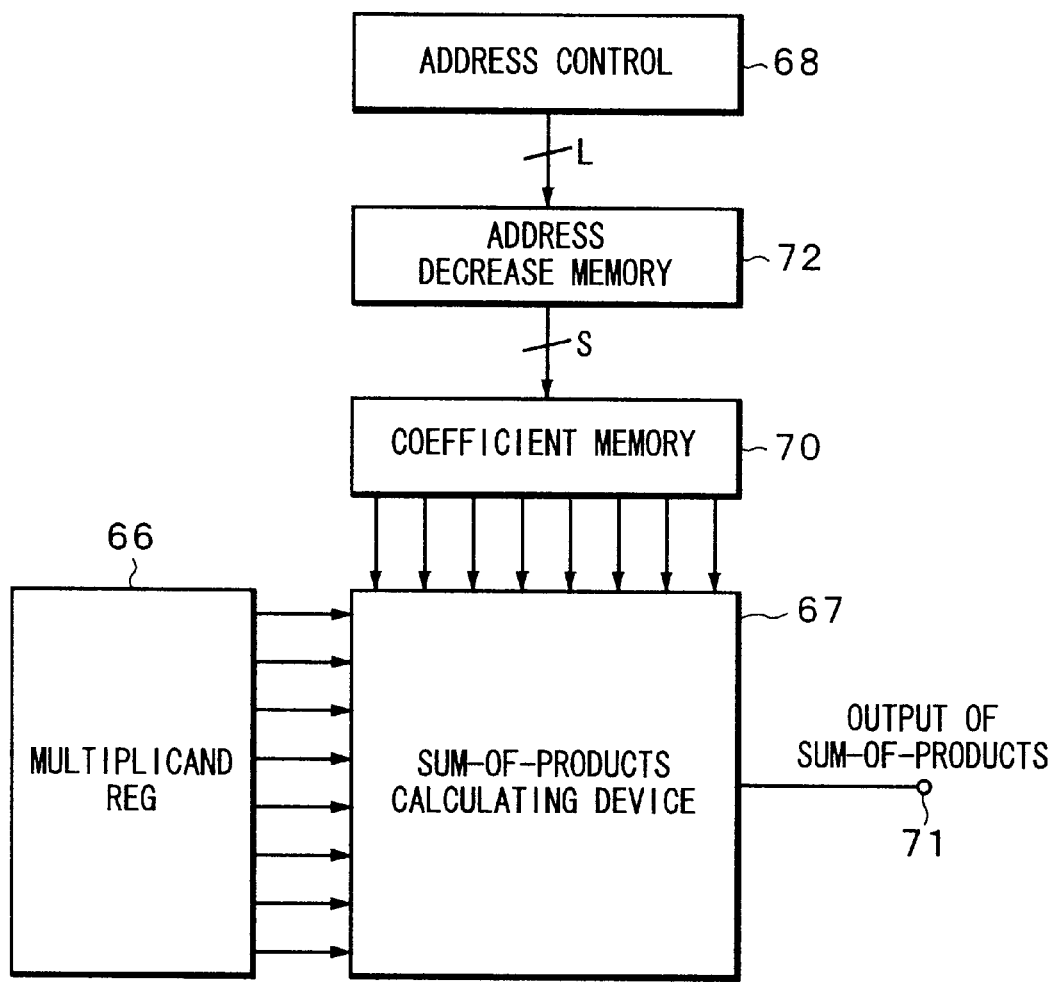
FIG. 15 is a circuit diagram showing a prediction circuit according to another embodiment of the present invention.

FIG. 15 shows a prediction circuit according to another embodiment of the present invention. For simplicity, in the second embodiment shown in FIG. 15, similar portions to those in the first embodiment shwon in FIG. 14 are denoted by similar reference numerals and their description is omitted. An address decrease memory 72 which a class code of L bits L-class is supplied is composed of a data conversion table of which the number of bits of the class code is decreased from L bits to S bits. Thus, a class code of S bits S-class corresponding to the class code of L bits L-class is read from the data convrsion table and supplied to a coefficient memory 70.

Figure 16:
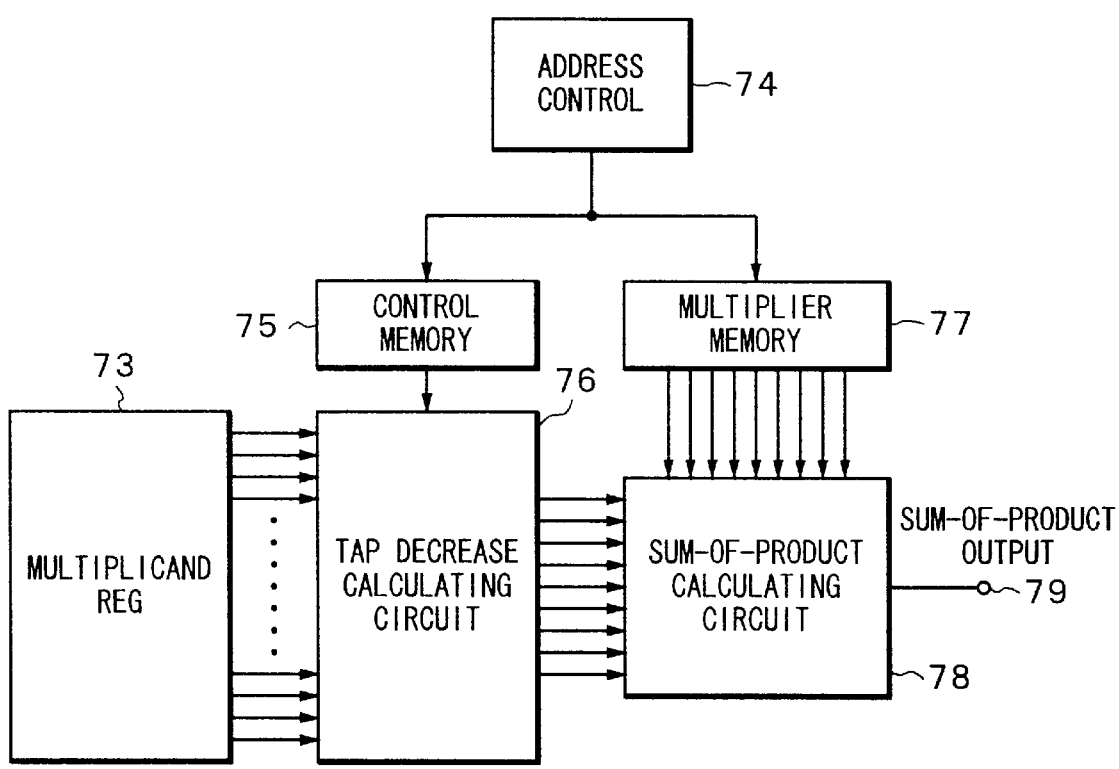
FIG. 16 is a circuit diagram showing an example of a prediction circuit according to the present invention.

FIG. 16 shows another example of a prediction circuit according to the embodiment of the present invention, in the case that the number of taps is decreased. Blocks shown in FIG. 16 correspond to the blocks shown in FIG. 1 as follows. An address controlling circuit 74 corresponds to the class code generating circuit 6. A control memory 75 corresponds to the tap decreasing ROM 7. A tap decrease calculating circuit 76 corresponds to the tap decreasing circuit 10. A multiplier memory 77 corresponds to the ROM table 8. A sum-of-product calculating device 78 corresponds to the prediction calculating circuit 11.

For example, SD data is supplied as a multiplicand from a multiplicand register 73 to the tap decrease calculating circuit 76. An address corresponding to the SD data is supplied from the address controlling circuit 74 to the control memory 75 and the multiplier memory 77. Data stored in the control memory 75 corresponding to the received address is supplied to the tap decrease calculating circuit 76.

The tap decrease calculating circuit 76 is controlled corresponding to the data received from the control memory 75. The tap decrease calculating circuit 76 decreases for example 25 SD data to nine SD data and supplies the decreased SD data to the sum-of-product calculating device 78. Coefficient data selected corresponding to the address received from the address controlling circuit 74 is supplied to the sum-of-product calculating device 78. The sum-of-product calculating device 78 executes a sum-of-product calculation as expressed by the above-described formula (1). The calculated result is supplied from an output terminal 79.

Figure 17:
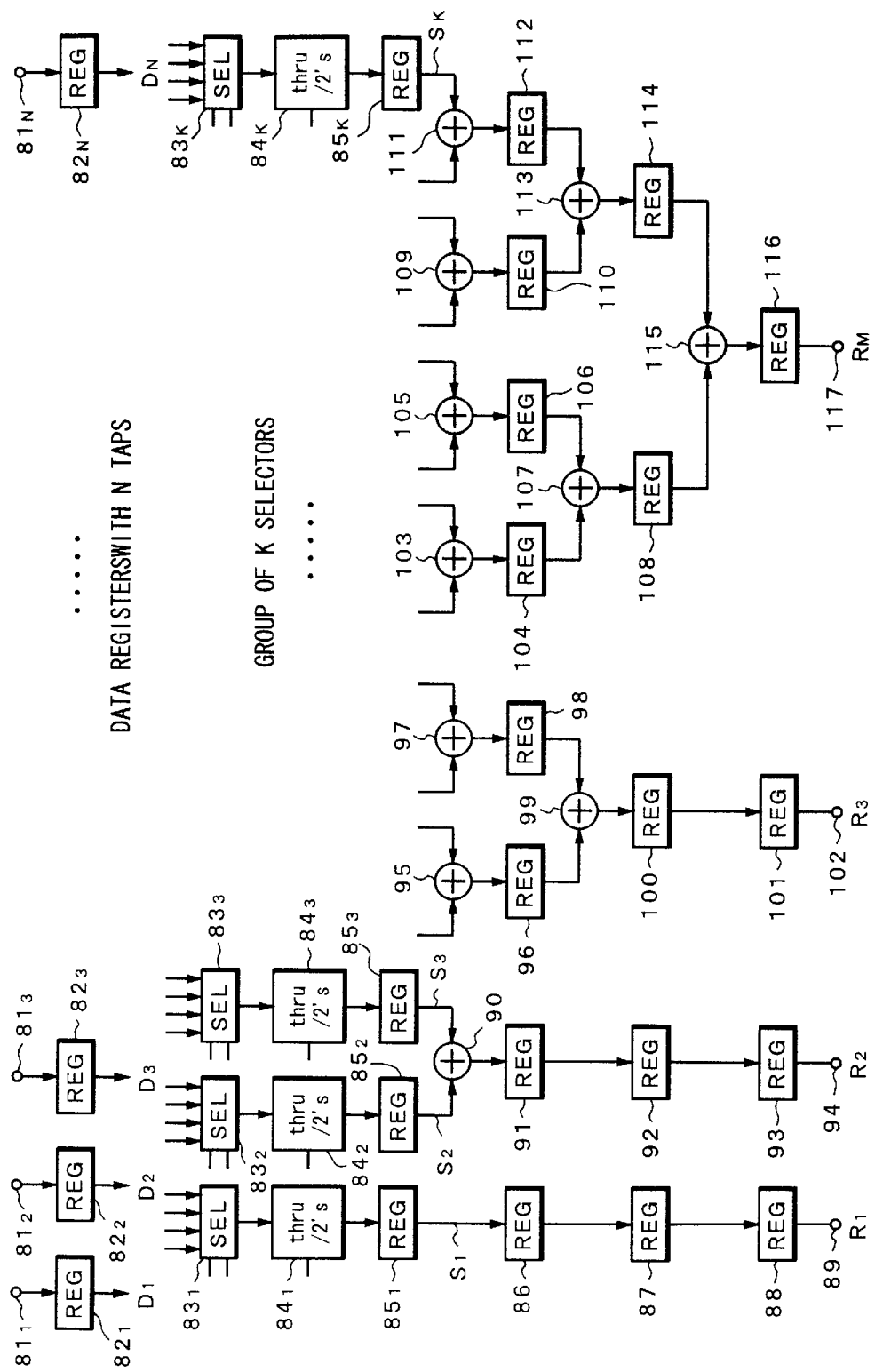
FIG. 17 is a circuit diagram showing an example of a tap decrease calculating circuit according to the present invention.

FIG. 17 is a circuit diagram of the tap decrease calculating circuit 76. N SD data Di (where $1 \leq i \leq N$) supplied from a multiplicand register 73 to a tap decrease calculating circuit 76 are supplied to registers $82_1$ to $82_N$ through input terminals $81_1$ to $81_N$. The N SD data $D_i$ are output to K selectors $83_1$ to $83_K$ (where K<N) through the registers $82_1$ to $82_N$. The selectors $83_1$ to $83_K$ select SD data $D_i$ corresponding to results that have been optimized. For example, as shown in FIG. 17, the selectors $83_1$ to $83_K$ select one of four input paths. The selected SD data $D_i$ are supplied to through/2's complement calculating circuits $84_1$ to $84_K$.

The through/2's complement calculating circuits $84_1$ to $84_K$ pass SD data Di or converts them into 2's complement corresponding to the supplied control signals. The 2's complement calculating circuit $84_1$ to $84_K$ perform a process that inverts 1/0 of the bit of the SD data Di and adds "1" to the LSB thereof. At this point, when it is not necessary to select whether or not to convert the SD data $D_i$ to 2's complement, output signals of the selectors $83_1$ to $83_K$ may be directly connected to registers $85_1$ to $85_K$, respectively. Output signals of the through/2's complement calculating circuits $84_1$ to $84_N$ are supplied to a calculating portion through registers $85_1$ to $85_K$, respectively.

Data $S_1$ supplied from the register $85_1$ is output as decreased data (reduced data) $R_1$ from an output terminal 89 through a calculating portion composed of registers 86, 87, and 88. The supplied data $S_1$ is directly output as it is. Data $S_2$ and $S_3$ supplied from the registers $85_2$ and $85_3$ are added by an adding device 90. The added result is output as decreased data $R_2$ from an output terminal 94 through registers 91, 92, and 93. This calculating portion adds two data $S_2$ and $S_3$.

An adding device 95 adds two data Ss. The added result is supplied to an adding device 99 through a register 96. An adding device 97 adds one or two data Ss. The added result is supplied to the adding device 99 through a register 98. The adding device 99 adds the two data received from the registers 96 and 98. The added result is output as decreased data $R_3$ from an output terminal 102 through registers 100 and 101. This calculating portion adds three or four data Ss.

An adding device 103 adds two data Ss. The added result is supplied to an adding device 107 through a register 104. An adding device 105 adds two data Ss. The added result is supplied to an adding device 107 through a register 106. An adding device 107 adds the two data received from the registers 104 and 106. The added result is supplied to an adding device 115 through a register 108.

An adding device 109 adds one or two data Ss. The added result is supplied to an adding device 113 through a register 110. An adding device 111 adds one or two data Ss. The added result is supplied to the adding device 113 through a register 112. No data may be supplied to the adding device 111. At this point, the adding device 111 does not supply output data. The adding device 113 adds the data received from registers 110 and 112. The added result is supplied to the adding device 115 through a register 114.

The adding device 115 adds two data received from the registers 108 and 114. The added result is supplied as decreased data $R_M$ from an output terminal 117 through a register 116. This calculating portion adds five to eight data Ss.

Thus, the data $D_1$ to $D_N$ are selected by the selectors $83_1$ to $83_K$ as data $S_1$ to $S_K$ and supplied to adding devices (calculating portions) with predetermined number of inputs. The number of inputs of this calculating portion is K. The selectors and the calculating portions are optimally connected corresponding to predetermined taps and the number of times of additions. Thus, finally, decreased data $R_1$ to $R_M$ almost equivalent to a filter with N taps can be obtained. However, the number of taps has the relation of M<K<N.

Figure 18:
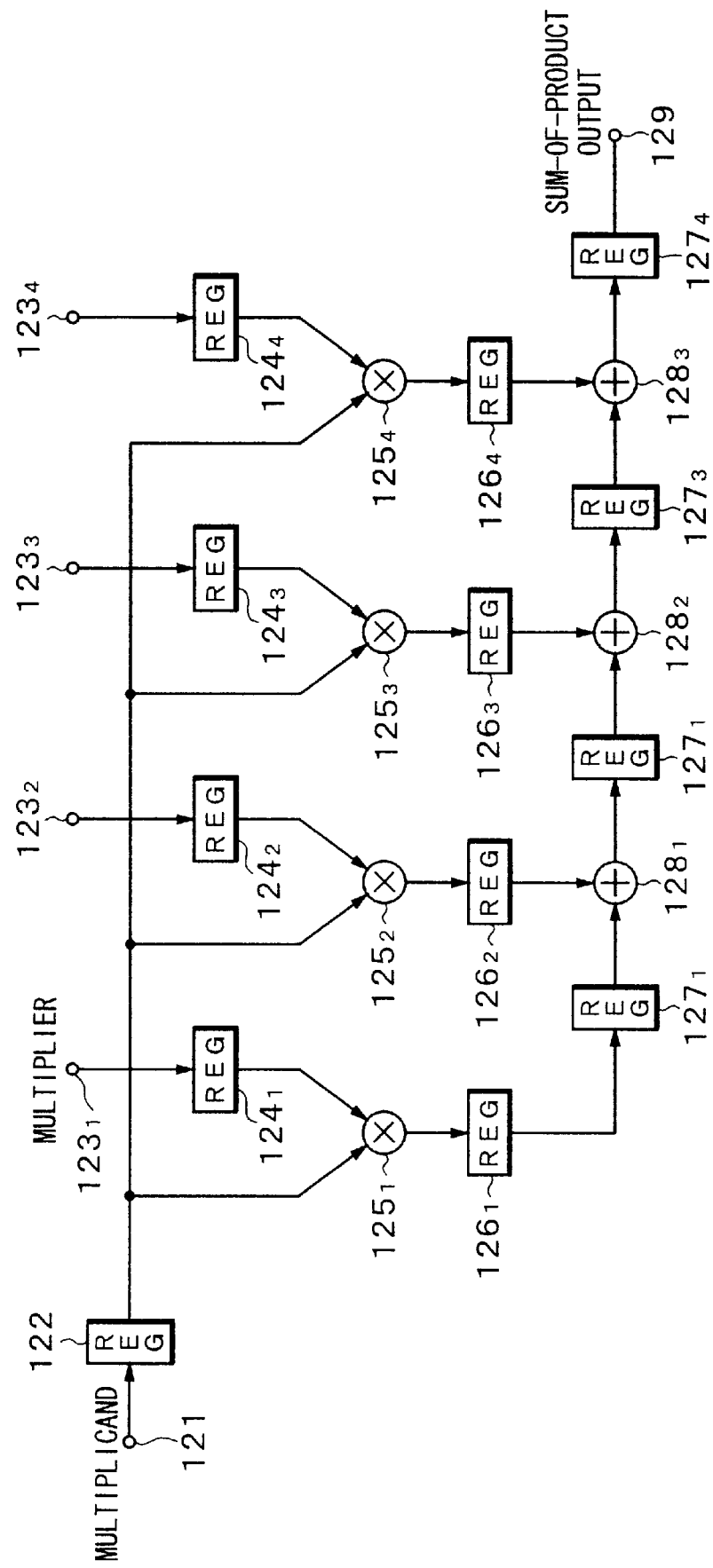
FIG. 18 is a circuit diagram showing an example of a sum-of-product calculating circuit according to the present invention.
Figure 19:
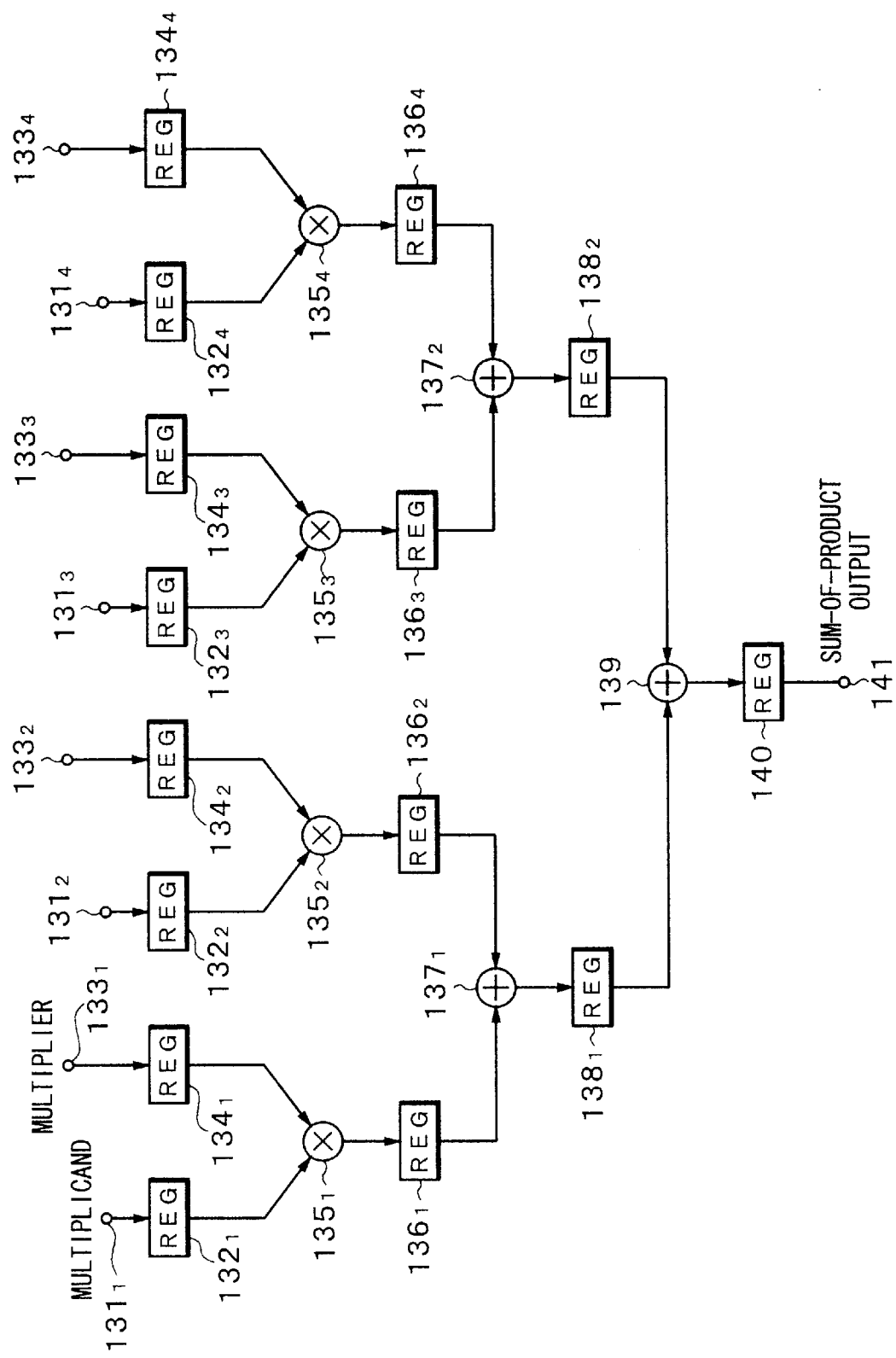
FIG. 19 is a circuit diagram showing an example of a sum-of-product calculating circuit according to the present invention.
Figure 20:
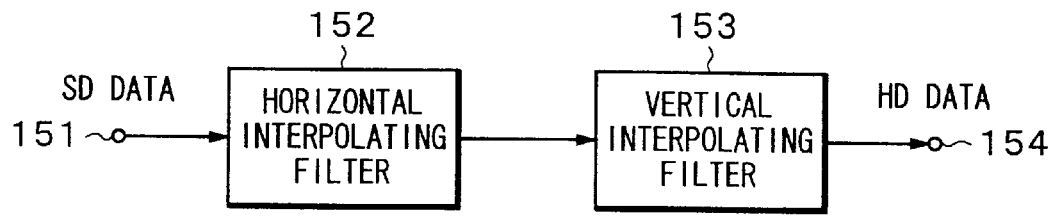
FIG. 20 is a circuit diagram showing a conventional picture information converting apparatus.
Figure 21:
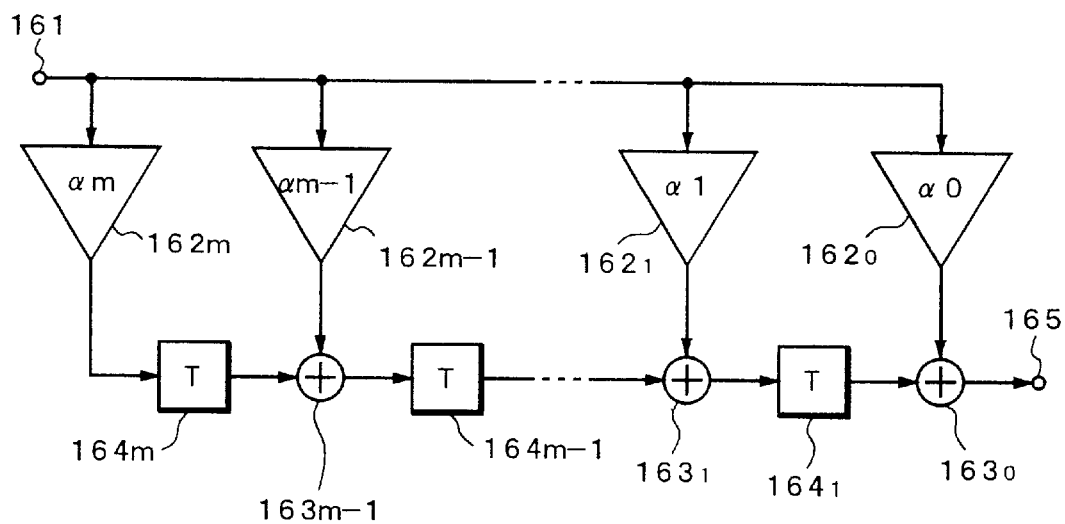
FIG. 21 us a circuit diagram showing principal portions of the conventional picture information converting apparatus.
Figure 22:
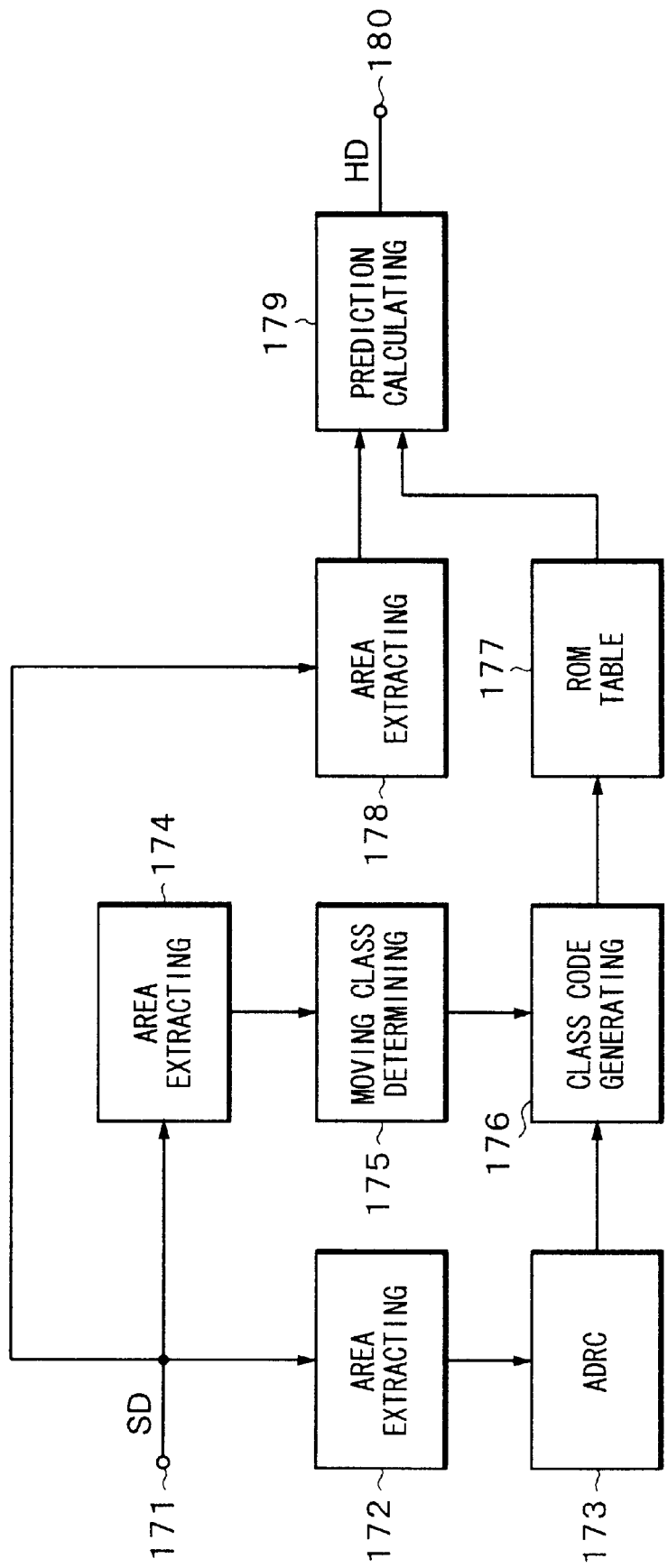
FIG. 22 is a block diagram showing an example of a picture information converting apparatus for use with the conventional picture converting apparatus.
Figure 23:
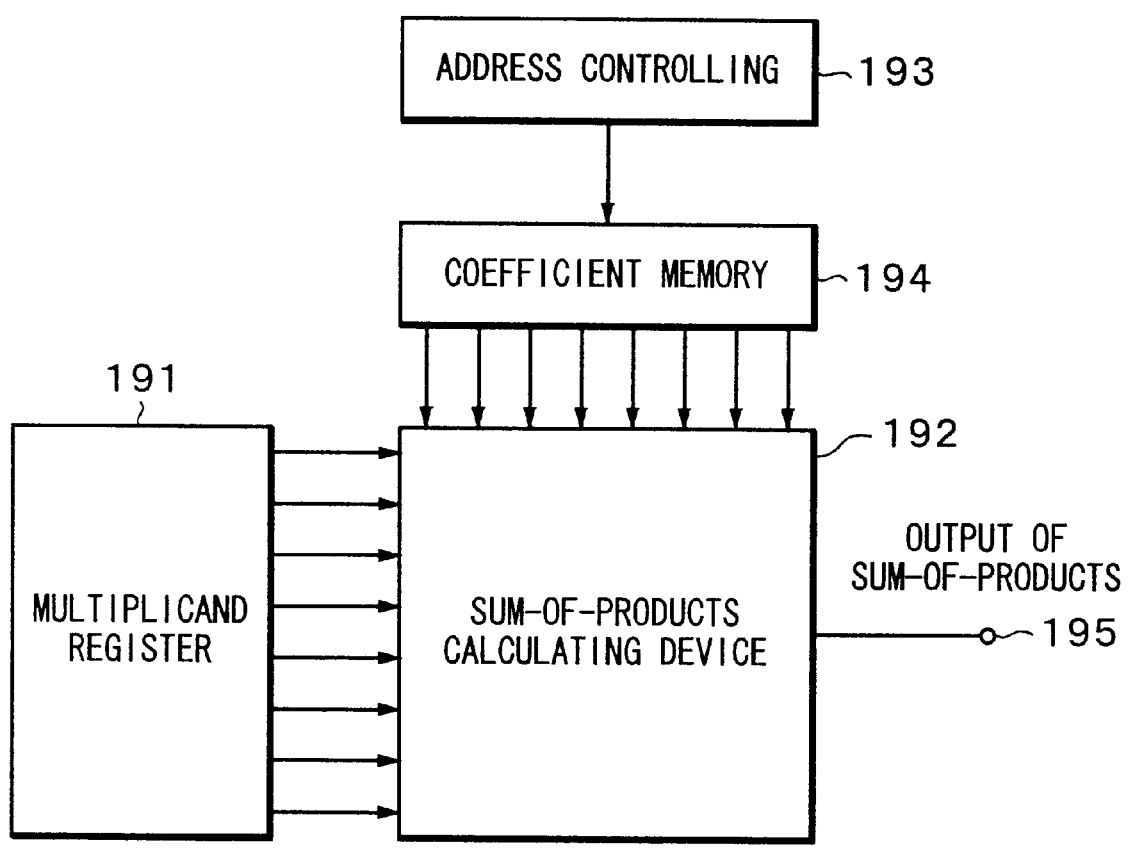
FIG. 23 is a circuit diagram showing a conventional prediction circuit.
Figure 24:
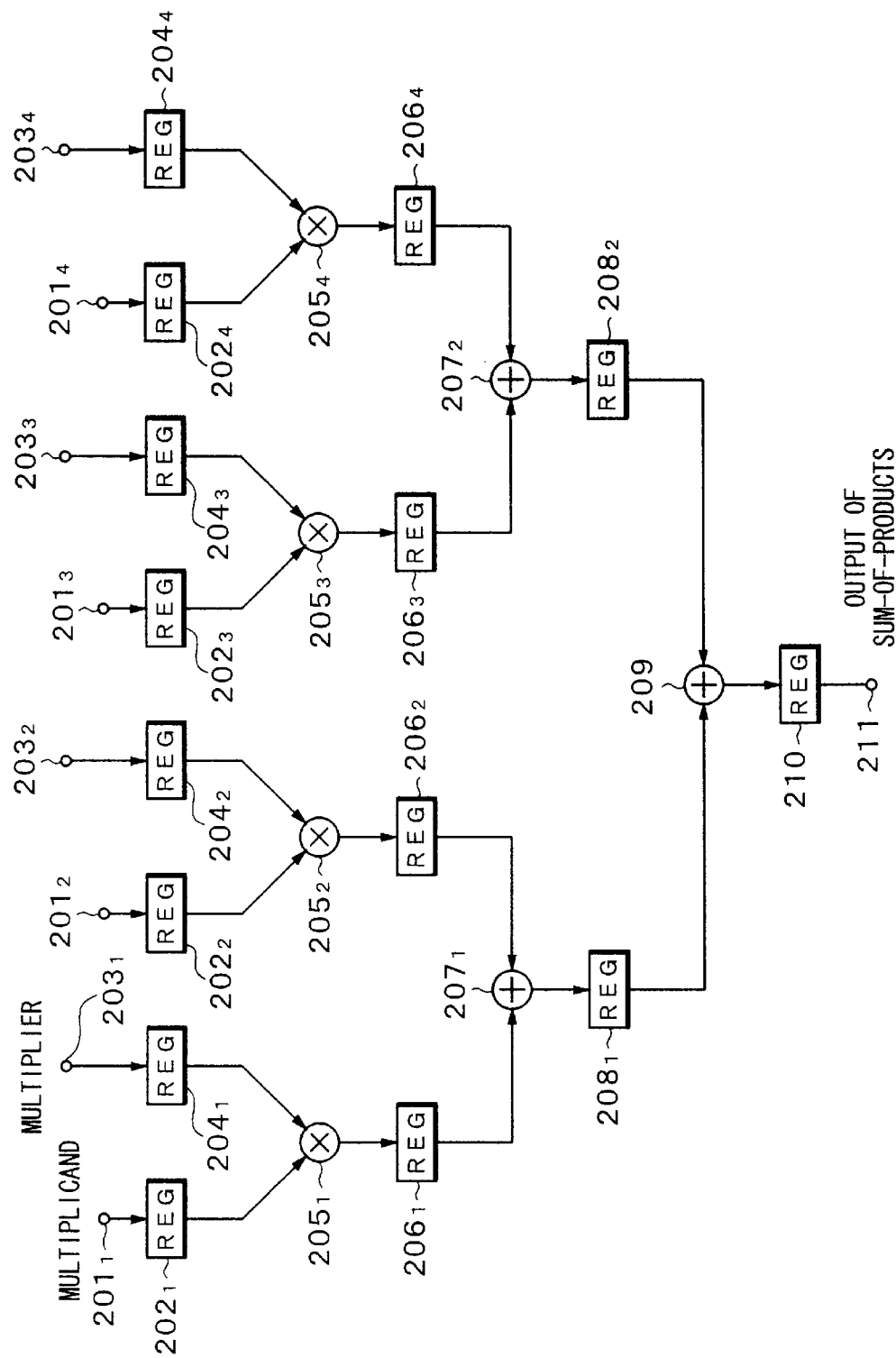
FIG. 24 is a circuit diagram showing a conventional signal interpolating circuit.

FIGS. 18 and 19 show examples of structures of sum-of-product calculating devices with multiplying devices. In these examples, the sum-of-product calculating devices have four taps. The sum-of-product calculating devices can be roughly categorized as a type of which multiplicands are successively supplied and pipelined for a sum-of-product calculation as shown in FIG. 18 and another type of which multiplicands are supplied at a time and multiplied results are added in parallel as shown in FIG. 19. The sum-of-product calculating circuit according to the present invention has the structure as shown in FIG. 19.

First of all, the sum-of-product calculating circuit shown in FIG. 18 will be described. A multiplicand (pixel data) is received from an input terminal 121. The multiplicand is supplied to multiplying devices $125_1$ to $125_4$ through a register 122. Multipliers (coefficients) are received from input terminals $123_1$ to $123_4$. The multipliers are supplied to the multiplying devices $125_1$ to $125_4$ through registers $124_1$ to $124_4$. The multiplying devices $125_1$ to $125_4$ multiply the multiplicands by the multipliers. The calculated results are supplied to registers $126_1$ to $126_4$. Output data of the register $126_1$ is supplied to an adding device $128_1$ through a register $127_1$. The adding device $128_1$ adds output data of the register $127_1$ and output data of a register $126_2$, the output data of the register $126_2$ being delayed for one sample.

The added result of the adding device $128_1$ is supplied to an adding device $128_2$ through a register $127_2$. The adding device $128_2$ adds output data received from the register $127_2$ and output data of the register $126_3$, the output data of the register $127_2$ being delayed for one sample. The added result of the adding device $128_2$ is supplied to an adding device $128_3$ through a register $127_3$. The adding device $128_3$ adds output data of a register $127_3$ and output data of the register $126_4$, the output data of the register $126_4$ being delayed for one sample. The added result of the adding device $128_3$ is output from an output terminal 129 through a register $127_4$.

FIG. 19 shows an example of the structure of the sum-of-product calculating device 78 according to the embodiment. Multiplicands (pixel data) are received from input terminals $131_1$ to $131_4$. The multiplicands are supplied to multiplier devices $135_1$ to $135_4$ through registers $132_1$ to $132_4$. Multipliers (coefficients) are received from input terminals $133_1$ to $133_4$. The multipliers are supplied to the multiplying devices $135_1$ to $135_4$ through registers $134_1$ to $134_4$. The multiplying devices $135_1$ to $135_4$ multiply the multiplicands and relevant multipliers. The multiplied results are supplied to adding devices $137_1$ and $137_2$ through registers $136_1$ to $136_4$.

The adding device $137_1$ adds output data of the register $136_1$ and output data of the register $136_2$. The added result is supplied to an adding device 139 through a register $138_1$. The adding device $137_2$ adds output data of the register $136_3$ and output data of the register $136_4$. The added result is supplied to an adding device 139 through a register $138_2$. The adding device 139 adds output data of the register $138_1$ and output data of the register $138_2$. The added result is output from an output terminal 141 through a register 140.

In the above-described embodiment, as an information compressing means for patterning a spatial waveform with a small number of bits, the ADRC circuit was provided. However, it should be noted that the present invention is not limited to such a structure. In other words, as long as the information compressing means can represent a pattern of a signal waveform with a small number of classes, any circuit can be provided. For example, a compressing means such as a DPCM (Differential Pulse Code Modulation) circuit or a VQ (Vector Quantization) circuit may be used.

According to the present invention, SD picture data with similar coefficient data is integrated beforehand. Thus, the number of pixels is apparently decreased. Consequently, a prediction calculating circuit and a coefficient ROM can be compactly structured without a tradeoff of the deterioration of the converting performance.

In addition, according to the present invention, since the hardware scale of a multiplier memory and a sum-of-product calculating device can be remarkably reduced, the overall hardware scale of the resultant apparatus can be remarkably reduced. In addition, the number of taps is decreased so that filter calculations of N taps are equivalently substituted with filter calculations of M taps (where M<N). Multipliers are values corresponding to characteristics of a picture. A tap decreasing circuit is structured so that the decrease of taps does not affect the resultant calculations. Thus, although the number of taps is decreased, data almost equivalent to that of a conventional apparatus can be obtained.

We claim:

1. A picture information converting apparatus for converting a first digital picture signal into a second digital picture signal, the number of pixels of the second digital picture signal being larger than the number of pixels of the first digital picture signal, comprising:

pixel extracting means for extracting the first digital picture signal at a predetermined position thereof;

class determining means for detecting a pattern of a level distribution of the first digital picture signal extracted by said pixel extracting means, determining a class of the second digital picture signal to be predicted corresponding to the pattern, and outputting the determined class information;

tap decreasing means for integrating data of a plurality of taps of the first digital picture signal into data of a smaller number of taps corresponding to similar coefficient data for each class information;

coefficient data storing means for storing coefficient data of a linear prediction equation for each class information; and predicting means for predicting the second digital picture signal with the integrated first digital picture signal and the coefficient data corresponding to a linear prediction equation.

2. The picture information converting apparatus as set forth in claim 1, wherein said pixel extracting means is an N tap register for outputting data of N taps corresponding to the first digital picture signal, wherein said tap decreasing means decreases the N taps to L taps, N being larger than L, wherein said class determining means controls said tap decreasing means, and wherein said predicting means executes a sum-of-product calculation with the coefficient data and the L taps.

3. The picture information converting apparatus as set forth in claim 1, wherein said tap decreasing means integrates data of taps of the first digital picture signal corresponding to predetermined additional code data.

4. The picture information converting apparatus as set forth in claim 3, wherein the additional code data is generated by a process comprising the steps of:

calculating the absolute values of the n coefficient data;

calculating the average value of the n coefficient data;

calculating the maximum value of the n coefficient data;

designating the average value, the maximum value, and a reference value as first representative values;

categorizing the absolute values of the n coefficient data as first groups corresponding to the first representative values, calculating the average values of the individual first groups, and designating the average values of the individual first groups as second representative values;

determining whether or not the number of the second representative values is (nn+1);

when it has been determined that the number of the second representative values is not (nn+1), categorizing the absolute values of the n coefficient data as second groups corresponding to the second representative values, calculating the average values of the individual second groups, adding and subtracting a constant value to/from the average value of a member with the maximum difference of the second groups so as to divide the average value, and re-designating the resultant values and the remaining values of the second groups; and when the number of the second representative values is (nn+1), outputting nn second representative values of which the reference value is removed from the second representative values as the nn coefficient data.

5. The picture information converting apparatus as set forth in claim 4, wherein the reference value is not changed when the first representative values are designated to the second representative values or when the second representative values are re-designated to the first representative values.

6. The picture information converting apparatus as set forth in claim 4, wherein the reference value is 0, and wherein 0 is not changed when the average values of the individual groups and/or the constant is added or subtracted.

7. A picture information converting method for converting a first digital picture signal into a second digital picture signal, the number of pixels of the second digital picture signal being larger than the number of pixels of the first digital picture signal, comprising the steps of:

extracting the first digital picture signal at a predetermined position thereof;

detecting a pattern of a level distribution of the first digital picture signal extracted by said pixel extracting means, determining a class of the second digital picture signal to be predicted corresponding to the pattern, and outputting the determined class information;

integrating data of a plurality of taps of the first digital picture signal into data of a smaller number of taps corresponding to similar coefficient data for each class information;

storing coefficient data of a linear prediction equation for each class information; and predicting the second digital picture signal with the integrated first digital picture signal and the coefficient data corresponding to a linear prediction equation.

8. A picture information converting apparatus for converting a first digital picture signal into a second digital picture signal, the number of pixels of the second digital picture signal being larger than the number of pixels of the first digital picture signal, comprising:

pixel extracting means for extracting the first digital picture signal at a predetermined position thereof;

class determining means for detecting a pattern corresponding to the first digital picture signal extracted by said pixel extracting means, determining a class of the second digital picture signal to be predicted corresponding to the pattern, and outputting an address of L bits as class information;

address decreasing means for decreasing the number of bits of the address of L bits to S bits, the number of S bits being smaller than the number of L bits;

coefficient data storing means for storing coefficient data of a linear prediction equation and reading coefficient data corresponding to the address of S bits; and predicting means for predicting the second digital picture signal corresponding to a linear prediction equation of the coefficient data and the first digital picture signal.

9. A picture information converting method for converting a first digital picture signal into a second digital picture signal, the number of pixels of the second digital picture signal being larger than the number of pixels of the first digital picture signal, comprising the steps of:

extracting the first digital picture signal at a predetermined position thereof;

detecting a pattern corresponding to the first digital picture signal that has been extracted, determining a class of the second digital picture signal to be predicted corresponding to the pattern, and outputting an address of L bits as class information;

decreasing the number of bits of the address of L bits to S bits, the number of S bits being smaller than the number of L bits;

storing coefficient data of a linear prediction equation and reading coefficient data corresponding to the address of S bits; and predicting the second digital picture signal corresponding to a linear prediction equation of the coefficient data and the first digital picture signal.

10. A sum-of-products calculating circuit for adding products of multipliers and multiplicands so as to calculate operations of a digital filter with M taps, comprising:

address decreasing means for decreasing the number of bits of an address for controlling a multiplier memory from L bits to S bits, L being larger than S;

multiplier data reading means for reading multiplier data corresponding to the address of S bits from the multiplier memory; and calculating means for generating the sum of products of the multiplier data that is read from the multiplier memory and multiplicand data.

11. The sum-of-products calculating circuit as set forth in claim 10, wherein an input signal is a digital picture signal, the multiplier data is coefficient data, and the multiplicand data is pixel data, wherein the sum-of-products calculating circuit further comprises class determining means for determining a class of pixel data to be predicted corresponding to a pattern of a level distribution of the digital picture signal and outputting the address of L bits as class information, and wherein said address decreasing means decreases the L bits to the S bits, the multiplier memory reads coefficient data from the multiplier memory corresponding to the class information of S bits that have been decreased, and said calculating means calculates the sum of products of the pixel data and the coefficient data.

12. The sum-of-products calculating circuit as set forth in claim 10, wherein said address decreasing means decreases the address of L bits to an address of S bits corresponding to a data conversion table stored in a memory.

13. The sum-of-products calculating circuit as set forth in claim 10, wherein said address decreasing means divides the address of L bits into high order bits and low order bits, shifts the low order bits by N bits corresponding to the state of the high order bits, adds the high order bits and the low order bits that have been shifted by N bits, and decreases the address of L bits to the address of S bits.

14. A sum-of-products calculating method for adding products of multipliers and multiplicands so as to calculate operations of a digital filter with M taps, comprising the steps of:

decreasing the number of bits of an address for controlling a multiplier memory from L bits to S bits, L being larger than S;

reading multiplier data corresponding to the address of S bits from the multiplier memory; and generating the sum of products of the multiplier data that is read from the multiplier memory and multiplicand data.

15. A sum-of-products calculating circuit for adding products of coefficient data and digital picture signal pixel data so as to operate as an M-tap digital filter, comprising:

class determining means for determining a class of pixel data to be predicted corresponding to a pattern of a level distribution of the digital picture signal and outputting an address of L bits as an indicator of said class;

address decreasing means for decreasing the number of bits of an address for controlling a multiplier memory from L bits to S bits, L being larger than S;

multiplier data reading means for reading coefficient data corresponding to the address of S bits from the multiplier memory; and calculating means for generating the sum of products of the coefficient data read from the multiplier memory and the pixel data.

* * * * *